(12) United States Patent
van den Berg et al.

(10) Patent No.: US 12,079,794 B2
(45) Date of Patent: Sep. 3, 2024

(54) SYSTEM AND METHOD OF OPERATING A CONSUMER DEVICE AS A PAYMENT DEVICE

(71) Applicant: Apple Inc., Cupertino, CA (US)

(72) Inventors: Frank Andries van den Berg, Valencia (ES); Sebastien Fontaine, Montreal (CA); Olivier M. Martin de la Bastide, Paris (FR); Eran Hollander, Needham, MA (US)

(73) Assignee: Apple Inc., Cupertino, CA (US)

( * ) Notice: Subject to any disclaimer, the term of this patent is extended or adjusted under 35 U.S.C. 154(b) by 284 days.

(21) Appl. No.: 17/537,245

(22) Filed: Nov. 29, 2021

(65) Prior Publication Data

US 2022/0084008 A1  Mar. 17, 2022

Related U.S. Application Data

(63) Continuation of application No. PCT/IB2020/055136, filed on May 29, 2020.
(Continued)

(51) Int. Cl.
*G06Q 20/32* (2012.01)
*G06Q 20/02* (2012.01)
*H04W 4/80* (2018.01)

(52) U.S. Cl.
CPC .......... *G06Q 20/322* (2013.01); *G06Q 20/02* (2013.01); *G06Q 20/3278* (2013.01); *H04W 4/80* (2018.02)

(58) Field of Classification Search
USPC ........................................................ 705/44
See application file for complete search history.

(56) References Cited

U.S. PATENT DOCUMENTS 8,099,353 B2    1/2012  Teague et al.
11,494,765 B2 *  11/2022  Tadiparti .............. G06Q 20/401
(Continued)

FOREIGN PATENT DOCUMENTS

EP   2 811 445 A1   10/2014
EP   2811445 A1 *  12/2014  ............. G06Q 20/34

OTHER PUBLICATIONS

Pymnts, Visa, How Consumers Use Connected Devices To Shop And Pay, Sep. 16, 2019, www.pymnts.com. (Year: 2019).*
(Continued)

*Primary Examiner* — Scott C Anderson
*Assistant Examiner* — George N. Proios
(74) *Attorney, Agent, or Firm* — Kilpatrick Townsend & Stockton LLP

(57) ABSTRACT

There is disclosed a method and system for performing a transaction between a buyer and a seller. A payment request may be received from a first device associated with the seller. An identifier of a second device associated with the buyer may be determined. Data corresponding to the payment request may be transmitted to the second device. The second device may request that the buyer present a payment card to the second device. Payment card data may be received, where the payment card data was read by an NFC interface of the second device communicating with the payment card. After receiving the payment card data, a request may be transmitted to complete the transaction. A notification of the transaction result may be transmitted to the first device.

17 Claims, 15 Drawing Sheets

Related U.S. Application Data

(60) Provisional application No. 62/855,281, filed on May 31, 2019.

(56) References Cited

U.S. PATENT DOCUMENTS

| | | | | |
|---|---|---|---|---|
| 2012/0129452 | A1* | 5/2012 | Koh et al. | 455/41.1 |
| 2016/0098693 | A1* | 4/2016 | Shauh et al. | G06Q 20/12 |
| 2017/0039561 | A1* | 2/2017 | Finley | G06Q 20/405 |
| 2017/0039562 | A1* | 2/2017 | Finley | G06Q 20/405 |
| 2018/0150840 | A1 | 5/2018 | Joung | |
| 2018/0330371 | A1* | 11/2018 | Tadiparti | G06Q 20/401 |
| 2019/0156321 | A1* | 5/2019 | Fontaine et al. | G06Q 20/3227 |

OTHER PUBLICATIONS

"The International Preliminary Report on Patentability and Written Opinion," mailed Dec. 9, 2021 in International Application No. PCT/IB2020/055136. 8 pages.

"Examination Report under Section 18(3)," mailed Jul. 24, 2023 in Great Britain Patent Application No. 2117304.2. 4 pages.

"Examination Report under Section 18(3)," mailed Nov. 4, 2022 in Great Britain Patent Application No. 2117304.2. 6 pages.

"The International Search Report and Written Opinion," mailed Sep. 04, 2020 in International Application No. PCT/IB2020/055136. 11 pages.

"Examination Report under Section 18(3)," mailed Mar. 10, 2023 in Great Britain Patent Application No. 2117304.2. 6 pages.

"Examination Report under Section 18(3)," mailed Oct. 9, 2023 in Great Britain Patent Application No. 2117304.2. 4 pages.

"Office Action," mailed Nov. 21, 2023 from the German Patent Office in Patent Application No. DE 112020002601.9. 13 pages.

* cited by examiner

SYSTEM AND METHOD OF OPERATING A CONSUMER DEVICE AS A PAYMENT DEVICE

CROSS-REFERENCE TO RELATED APPLICATIONS

This present application is a continuation of the PCT application No. PCT/IB2020/055136, filed May 29, 2020, which claims the benefit of and priority to U.S. Provisional Patent Application No. 62/855,281, filed on May 31, 2019, the disclosures of which are hereby incorporated by reference in their entirety for all purposes.

FIELD

The present technology relates to systems and methods of operating a consumer device as a payment device, in particular to systems and methods allowing a switch from card not present (CnP) to card present (CP) transactions by enabling a consumer device to act as a payment device.

BACKGROUND

An online transaction with a remote seller platform which involves providing payment card information by typing a payment card number and/or other payment card data and/or providing payment information remotely via another method such as a virtual wallet, is deemed to be a card not present (CnP) transaction. Such CnP transactions are widely used for online shopping or renting of products, content or services. Conversely, card present (CP) transactions typically occur as part of a "brick and mortar" transaction during which a buyer is at a physical location (e.g. retail store) of the seller and completes the financial transaction by a physical interaction between the payment card and a payment terminal of the seller (e.g., via swiping or inserting the payment card in the payment terminal, or via a contactless interaction between the payment card and the payment terminal). A CP transaction may occur when a buyer is physically in a retail store and purchasing an item from that retail store, or when a buyer stands in front of a kiosk, which may also be referred to as an Unattended Terminal CP transaction.

CnP transactions typically involve a higher risk of fraud than CP transactions as a bad actor can acquire the payment card number and/or other information associated with the payment card and the bad actor may then complete a CnP transaction even though they are not in possession of the payment card. Conversely, CP transactions typically present a lesser risk of fraud than CnP transactions as the buyer generally needs to be in possession of the payment card to perform a CP transaction. As a result of the greater risk of fraud associated with CnP transactions, higher payment processing fees are applied to CnP transactions compared to CP transactions. It may be advantageous to sellers who perform remote transactions if they could perform CP transactions instead of CnP transactions. This may reduce the payment processing fees applied to the remote transactions and/or improve a security level associated with the performing of remote transactions.

SUMMARY

In order to alleviate some of the limitations existing with current approaches, the present technology offers systems and methods of operating a consumer device, such as the buyer's mobile phone, as a payment device for the seller. The buyer's mobile phone may be configured to act as a payment device of the seller, such as a point of sale (POS) device, terminal device, payment terminal of the seller, etc. This may allow an online or remote transaction between a buyer and a seller to be processed as a CP transaction (and not as CnP transaction) thereby reducing risks of fraud and/or associated processing fees.

According to a first broad aspect of the present technology, there is provided a method for processing payment for a transaction between a buyer and a seller. The method comprises: receiving, from a first device associated with the seller, a payment request corresponding to the transaction, wherein the payment request comprises an indication of the buyer; determining, based on the payment request, an identifier of a second device associated with the buyer; transmitting, based on the identifier and to the second device, data corresponding to the payment request; causing the second device to request that the buyer present a payment instrument to the second device; receiving, from the second device, payment instrument data; and after receiving the payment instrument data: transmitting a request to complete the transaction, receiving a transaction result, and transmitting a notification to the first device indicating the transaction result.

In some implementations of the method, the payment instrument data was acquired by a near-field communication (NFC) interface of the second device communicating with the payment instrument.

In some implementations of the method, the payment instrument data was generated by a mobile wallet of the second device.

In some implementations of the method, the payment instrument data comprises a payment token.

In some implementations of the method, the payment token comprises a card present (CP) payment token.

In some implementations of the method, the payment instrument is a payment card.

In some implementations of the method, the payment instrument is a mobile wallet.

In some implementations of the method, the first device is a server.

In some implementations of the method, the server is associated with a website of the seller.

In some implementations of the method, causing the second device to request that the buyer present the payment instrument to the second device comprises causing an applet on the second device to activate.

In some implementations of the method, the applet is configured to communicate with an NFC interface of the second device.

In some implementations of the method, the applet is configured to display a merchant name and a transaction amount corresponding to the transaction.

In some implementations of the method, the data corresponding to the payment request comprises a transaction amount corresponding to the transaction.

In some implementations of the method, the data corresponding to the payment request comprises a merchant name corresponding to the transaction.

In some implementations of the method, the data corresponding to the payment request comprises an image.

In some implementations of the method, the data corresponding to the payment request comprises text received from the seller.

In some implementations of the method, the method further comprises determining, based on the identifier of the second device, a terminal identifier (TID) corresponding to the second device.

In some implementations of the method, the method further comprises receiving, from the second device, a terminal identifier (TID) corresponding to the second device.

In some implementations of the method, the request to complete the transaction comprises the TID.

In some implementations of the method, causing the second device to request that the buyer present the payment instrument to the second device comprises causing the second device to activate an application corresponding to the seller.

In some implementations of the method, the application corresponding to the seller displays the request that the buyer present the payment instrument to the second device.

In some implementations of the method, the application corresponding to the seller activates a payment applet configured to acquire the payment instrument data via an NFC interface of the second device.

In some implementations of the method, the method further comprises transmitting, to the second device, a second notification indicating the transaction result.

In some implementations of the method, the identifier of the second device comprises a phone number corresponding to the second device.

In some implementations of the method, the identifier of the second device comprises a device identifier (device ID) corresponding to the second device.

In some implementations of the method, the identifier of the second device comprises an application identifier (application ID) corresponding to the second device.

In some implementations of the method, the method further comprises causing an application corresponding to the application ID to request that the buyer present the payment instrument to the second device.

In some implementations of the method, the application is configured to activate a payment applet of the second device.

In some implementations of the method, the application provides a configuration to the payment applet.

In some implementations of the method, the indication of the buyer comprises a phone number.

In some implementations of the method, the indication of the buyer comprises an e-mail address.

In some implementations of the method, the transaction result indicates that the transaction was approved or declined.

In some implementations of the method, the transaction result indicates that the payment instrument was stolen.

In some implementations of the method, the method further comprises transmitting, based on the identifier and to the second device, a request to install an applet on the second device.

In some implementations of the method, the data corresponding to the payment request comprises an identifier of the seller.

In some implementations of the method, the identifier of the seller comprises a merchant ID (MID) corresponding to the seller.

In some implementations of the method, the identifier of the seller comprises an application programming interface (API) key corresponding to the seller.

According to another broad aspect of the present technology, there is provided a method for processing payment for a transaction between a buyer and a seller. The method comprises: receiving, from a first device, a payment request corresponding to the transaction, wherein the payment request comprises an indication of the buyer, and wherein the first device is associated with the seller; determining, based on the payment request, an identifier of a second device, wherein the second device is associated with the buyer; determining, based on the identifier of the second device, an operating system of the second device; transmitting, to a server corresponding to the operating system, data corresponding to the payment request and the identifier of the second device; causing the second device to request that the buyer present a payment instrument to the second device; receiving, from the second device, payment instrument data, wherein the payment instrument data was acquired by a near-field communication (NFC) interface of the second device communicating with the payment instrument; and after receiving the payment instrument data: transmitting a request to complete the transaction, and receiving a transaction result, and transmitting a notification to the first device indicating the transaction result.

In some implementations of the method, the payment instrument is a payment card.

In some implementations of the method, the payment instrument is a mobile wallet.

In some implementations of the method, the method further comprises activating, by the operating system, the NFC interface; and capturing, by the operating system and via the NFC interface, the payment instrument data.

In some implementations of the method, causing the second device to request that the buyer present the payment instrument to the second device comprises causing an applet on the second device to activate.

In some implementations of the method, the applet is configured to communicate with the NFC interface.

In some implementations of the method, the applet is integrated within the operating system.

In some implementations of the method, the applet is configured to display a merchant name and a transaction amount corresponding to the transaction.

In some implementations of the method, the method further comprises determining, based on the identifier of the second device, a terminal identifier (TID) corresponding to the second device.

In some implementations of the method, the method further comprises receiving, from the second device, a terminal identifier (TID) corresponding to the second device.

In some implementations of the method, the request to complete the transaction comprises the TID.

In some implementations of the method, the method further comprises transmitting, to the second device, a second notification indicating the transaction result.

In some implementations of the method, the identifier of the second device comprises a phone number corresponding to the second device.

In some implementations of the method, the identifier of the second device comprises a device identifier (device ID) corresponding to the second device.

In some implementations of the method, the indication of the buyer comprises a phone number.

According to another broad aspect of the present technology, there is provided a method for processing payment for a transaction between a buyer, an intermediary, and a seller. The method comprises: receiving, from a first device associated with the intermediary, a payment request corresponding to the transaction, wherein the payment request comprises an indication of the buyer; determining, based on the payment request, an identifier of a second device associated with the buyer; transmitting, based on the identifier and to the second device, data corresponding to the payment request, wherein the data indicates the seller; causing the second device to request that the buyer present a payment instrument to the second device; receiving, from the second device, payment instrument data, wherein the payment instrument data was acquired by a near-field communication (NFC) interface of the second device communicating with the payment instrument; and after receiving the payment instrument data: transmitting a request to complete the transaction, wherein the request to complete the transaction comprises an indication of the seller, receiving a transaction result, and transmitting, to the first device, a notification indicating the transaction result.

In some implementations of the method, the payment instrument is a payment card.

In some implementations of the method, the payment instrument is a mobile wallet.

In some implementations of the method, causing the second device to request that the buyer present the payment instrument to the second device comprises causing an applet on the second device to activate.

In some implementations of the method, the applet is configured to communicate with the NFC interface.

In some implementations of the method, the applet is configured to display a merchant name and a transaction amount corresponding to the transaction.

In some implementations of the method, the method further comprises determining, based on the identifier of the second device, a terminal identifier (TID) corresponding to the second device.

In some implementations of the method, the method further comprises receiving, from the second device, a terminal identifier (TID) corresponding to the second device.

In some implementations of the method, the request to complete the transaction comprises the TID.

In some implementations of the method, the method further comprises transmitting, to the second device, a second notification indicating the transaction result.

In some implementations of the method, the identifier of the second device comprises a phone number corresponding to the second device.

In some implementations of the method, the identifier of the second device comprises a device identifier (device ID) corresponding to the second device.

In some implementations of the method, the indication of the buyer comprises a phone number.

According to another broad aspect of the present technology, there is provided a method for processing payment for a transaction between a buyer and a seller. The method comprises: receiving, from a first device associated with the seller, a payment request corresponding to the transaction, wherein the payment request comprises an indication of the buyer; determining, based on the payment request, an identifier of a second device associated with the buyer; transmitting, based on the identifier and to the second device, data corresponding to the payment request; causing the second device to request that the buyer authorize the payment via a payment service of the second device; receiving, from the second device, a payment token corresponding to the payment service; and after receiving the payment token: transmitting a request to complete the transaction, receiving a transaction result, and transmitting a notification to the first device indicating the transaction result.

In some implementations of the method, the method further comprises causing the second device to display a merchant name and a transaction amount corresponding to the transaction.

In some implementations of the method, the method further comprises determining, based on the identifier of the second device, a terminal identifier (TID) corresponding to the second device.

In some implementations of the method, the method further comprises receiving, from the second device, a terminal identifier (TID) corresponding to the second device.

In some implementations of the method, the request to complete the transaction comprises the TID.

In some implementations of the method, the method further comprises transmitting, to the second device, a second notification indicating the transaction result.

In some implementations of the method, the identifier of the second device comprises a phone number corresponding to the second device.

In some implementations of the method, the identifier of the second device comprises a device identifier (device ID) corresponding to the second device.

In some implementations of the method, the indication of the buyer comprises a phone number.

According to another broad aspect of the present technology, there is provided a method for a transaction between a buyer and a seller. The method comprises: receiving, from a device associated with the buyer, a payment request corresponding to the transaction, wherein the device is accessing a website associated with the seller; transmitting, to the device, data corresponding to the payment request; causing the device to request that the buyer present a payment instrument to the device; receiving, from the device, payment instrument data, wherein the payment instrument data was acquired by a near-field communication (NFC) interface of the device communicating with the payment instrument; and after receiving the payment instrument data: transmitting a request to complete the transaction, receiving a transaction result, and transmitting a notification to the device indicating the transaction result.

In some implementations of the method, the method further comprises transmitting, to the device a script.

In some implementations of the method, causing the device to request that the buyer present a payment instrument to the device comprises causing the device to execute the script.

In some implementations of the method, the method further comprises determining, based on the identifier of the second device, a terminal identifier (TID) corresponding to the second device.

In some implementations of the method, the method further comprises receiving, from the second device, a terminal identifier (TID) corresponding to the second device.

In some implementations of the method, the request to complete the transaction comprises the TID.

According to another broad aspect of the present technology, there is provided a method for a transaction between a buyer and a seller, the method comprising: receiving, from a first device associated with the seller, a payment request corresponding to the transaction, wherein the payment request comprises an indication of the buyer; determining, based on the payment request, an identifier of a second device associated with the buyer; transmitting, based on the identifier and to the second device, data corresponding to the payment request, wherein the data corresponding to the payment request comprises an address of a third device; causing the second device to request that the buyer present a payment instrument to the second device; causing the second device to transmit the payment instrument data to the third device, wherein the payment instrument data was acquired by a near-field communication (NFC) interface of the second device communicating with the payment instrument; and receiving a transaction result.

In some implementations of the method, the payment instrument is a payment card.

In some implementations of the method, the payment instrument is a mobile wallet.

In some implementations of the method, causing the second device to request that the buyer present the payment instrument to the second device comprises causing an applet on the second device to activate.

In some implementations of the method, the applet is configured to communicate with the NFC interface.

In some implementations of the method, the applet is configured to display a merchant name and a transaction amount corresponding to the transaction.

In some implementations of the method, the method further comprises determining, based on the identifier of the second device, a terminal identifier (TID) corresponding to the second device.

In some implementations of the method, the method further comprises receiving, from the second device, a terminal identifier (TID) corresponding to the second device.

In some implementations of the method, the request to complete the transaction comprises the TID.

In some implementations of the method, the method further comprises transmitting, to the second device, a second notification indicating the transaction result.

In some implementations of the method, the identifier of the second device comprises a phone number corresponding to the second device.

In some implementations of the method, the identifier of the second device comprises a device identifier (device ID) corresponding to the second device.

In some implementations of the method, the indication of the buyer comprises a phone number.

A system for processing payment for a transaction, the system comprising: a processor; and a non-transitory computer-readable medium comprising instructions, the processor, upon executing the instructions, causing performance of any of the methods described above.

Various implementations of the present technology provide a non-transitory computer-readable medium storing program instructions for executing one or more methods described herein, the program instructions being executable by a processor of a computer-based system.

Various implementations of the present technology provide a computer-based system, such as, for example, but without being limitative, an electronic device comprising at least one processor and a memory storing program instructions for executing one or more methods described herein, the program instructions being executable by the at least one processor of the electronic device.

Additional and/or alternative features, aspects and advantages of implementations of the present technology will become apparent from the following description, the accompanying drawings, and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION OF THE DRAWINGS

Figure 1:
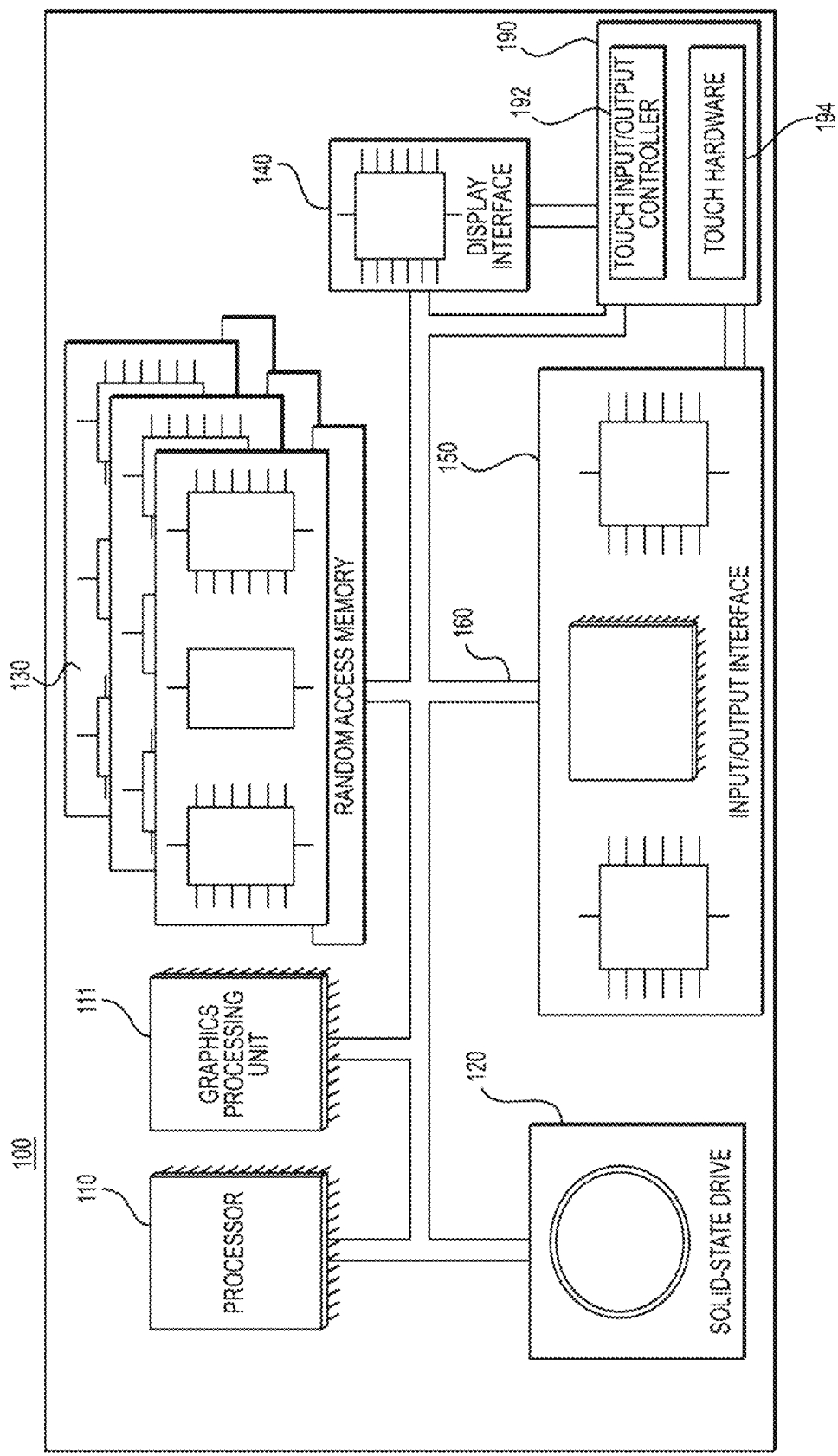
FIG. 1 is a block diagram of an example computing environment in accordance with various embodiments of the present technology.

Various exemplary embodiments of the described technology will be described more fully hereinafter with reference to the accompanying drawings, in which exemplary embodiments are shown. The present inventive concept may, however, be embodied in many different forms and should not be construed as limited to the exemplary embodiments set forth herein. Rather, these exemplary embodiments are provided so that the disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular exemplary embodiments and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the present disclosure, reference is made to secure transactions (for example, but without being limitative, contact and contactless transactions), secure elements (for example, but without being limitative, chipset, secured chipset, hardware embedded secured element, software secure element (SoftSE), or firmware embedding secured component) and security standards. Examples of security standards include, without being limitative, EMV standards, certification standards from EMVCo, MasterCard®, Visa®, American Express®, JCB®, Discover® and from the PCI SSC (Payment Card Industry Security Standards Council), founded by MasterCard®, Visa®, American Express®, Discover® and JCB® and dealing specifically with the definition of security standards for financial transactions. Reference to secure transactions, secure elements, and security standards is made for the purpose of illustration and is intended to be exemplary of the present technology and not limiting of the scope thereof.

In the context of the present technology, a "processor" may refer to a system on chip (SoC), an integrated circuit that integrates components of a computer in a single chip. A typical SoC may include but is not limited to one or more: general-purpose microprocessors or Central Processing Units (CPUs), co-processors such as a digital signal processor (DSP), a cryptographic coprocessor, a Graphics Processing Unit (GPU), and/or multimedia coprocessors such as MPEG and JPEG encoders and decoders. The cryptographic coprocessor or coprocessors may be embedded in order to reduce the amount of time used to perform cryptographic operations and/or to securely support cryptographic operations. The SoC may also include modems for various wireless communications interfaces including cellular (e.g. LTE/4G, 3G, GSM, CDMA, etc.), Bluetooth, and Wireless Fidelity (Wi-Fi) (IEEE 802.11). The SoC may include memory controllers for interfacing with on-die or external DRAM memory chips, and on-die memory blocks including a selection of ROM, SRAM, DRAM, EEPROM and flash memory. The SoC may additionally include timing sources, peripherals including counter-timers, real-time timers and power-on reset generators, debug, JTAG and Design For Test (DFT) interfaces, external interfaces, analog interfaces, voltage regulators, power management circuits, etc. The SoC may also include connectivity components such as simple buses or on-chip networks following the ARM Advanced Microcontroller Bus Architecture (AMBA) specification connecting these blocks together as known in the art. Some blocks may be packaged separately and stacked on the top of the SoC, a design known in the art as Package-on-package (PoP). Alternatively some blocks may be comprised in distinct integrated circuits (or dies) but packaged together, a design known in the art as a System in Package (SiP).

In the context of the present technology, an "isolated secured area of the processor (ISA)" may refer to a processing entity characterized by specific hardware and/or software components subject to a certification ensuring a specific level of security according to specific security standards. The isolated secured area ensures that sensitive data is stored, processed and protected in a secured and trusted environment of the processor while maintaining high processing speeds and large amounts of accessible memory. The isolated secured area may offer isolated execution, secure storage, remote attestation, secure provisioning, trusted boot and trusted path. The isolated secured area allows the processor to operate in two logical modes: normal world or secure world. The normal world is run by the non-secure area of the processor and may comprise the non-secure Rich Operating System (Rich OS) and the software components and applications that run on top of the Rich OS. The normal world is excluded from accessing resources that are provisioned for exclusive use in the secure world. The secure world is run by the isolated secured area, which is the only entity to have access to resources provisioned for use exclusively in the secured area, such as certain delineated ranges of ROM or RAM memory, processor or coprocessor configuration registers, and certain peripherals such as display controllers or touch screen controllers, and their associated configuration registers. Some of the resources provisioned for the exclusive use of the isolated secure area may be on the same die or package as the SoC, while others may be contained in a different die or package. Some of the resources may be dynamically provisioned for the exclusive use of the isolated secure area at certain times, while at other times they may be available for use by the normal world. The isolated secured area only runs authorized and trusted applications and provides security against logical attacks generated in the Rich OS environment, attacks aiming to compromise boot firmware, attacks that exploit debug and test interfaces and other non-invasive attacks. Non-limiting examples of an isolated secured area of the processor include Trusted Execution Environment (TEE), Intel Trusted Execution Technology (TXT), the Trusted Platform Module (TPM), the Hengzhi chip and the IBM Embedded Security Subsystem (ESS) chip. In some embodiments, the isolated secured area of the processor is designed so as to not be accessed, even by a human administrator. In some embodiments, the isolated secured area may be implemented partially or completely via a dedicated hardware element such as, but without being limited thereto, a secure element as defined in the paragraph below. Other variations of the isolated secured area may also be envisioned by the person skilled in the art of the present technology without departing from the scope of the present technology.

In the context of the present technology, a "secure element" may refer to a processing entity characterized by specific hardware and/or software components which may be subject to a certification ensuring a specific level of security according to specific security standards. From a hardware perspective, a secure element includes the usual components found in a computing entity: at least one microprocessor (e.g. CPU), memory (e.g. ROM, RAM or FLASH memory), communication interfaces, etc. Specific hardware components may also be included to implement specific functionalities particular to a secure element. For instance, a cryptographic accelerator may be included. Also, various tamper resistance, tamper detection and/or tamper response features may be included to prevent a malicious actor from extracting sensitive information from the secure element. Anti-tamper measures may comprise hardware aspects, software aspects, or a combination of hardware and software. Also, certain counter-measures to prevent side-channel attacks aiming to recover cryptographic keys or other sensitive information may be included in the secure element. Counter-measures against side-channel attacks may include hardware aspects, software aspects, or both. Also, measures to reduce EM emissions, such as shielding, may be included, to protect the secure element from eavesdropping. In the context of financial transactions, the certification of the secure element ensures that various financial entities are willing to use the secure element to store and process critical financial data, and to perform secured financial transactions using the critical financial data. In some embodiments, the secure element may be solely characterized by software components. The secure element may be, in some embodiments, implemented partially or completely as an isolated secured area of the processor, such as the isolated secured as described in the paragraph above, in which case, the secure element may be implemented, for example, but without being limitative, as a TEE, a TPM and/or a ESS. In some embodiments, the secure element (SE) may also be equally referred to as an embedded secure element (eSE). Other variations of the secure element may also be envisioned by the person skilled in the art of the present technology without departing from the scope of the present technology.

Even though the various components defined above are each associated with a definition, it should be understood that each one of the various components should not be construed as being solely limited to the specific functions and/or specifics provided in the associated definition. To the contrary, other functions and/or specifics may be added, removed or combined without departing from the scope of the present technology.

Computing Environment

FIG. 1 illustrates a computing environment 100, which may be used to implement and/or execute any of the methods described herein. In some embodiments, the computing environment 100 may be implemented by any of a conventional personal computer, a network device and/or an electronic device (such as, but not limited to, a mobile device, a tablet device, a server, a controller unit, a control device, etc.), and/or any combination thereof appropriate to the relevant task at hand. In some embodiments, the computing environment 100 comprises various hardware components including one or more single or multi-core processors collectively represented by processor 110, a solid-state drive 120, a random access memory 130, and an input/output interface 150. The computing environment 100 may be a generic computer system.

In some embodiments, the computing environment 100 may also be a subsystem of one of the above-listed systems. In some other embodiments, the computing environment 100 may be an "off-the-shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Those skilled in the art will appreciate that processor 110 is generally representative of a processing capability. In some embodiments, in place of or in addition to one or more conventional Central Processing Units (CPUs), one or more specialized processing cores may be provided. For example, one or more Graphic Processing Units 111 (GPUs), Tensor Processing Units (TPUs), and/or other so-called accelerated processors (or processing accelerators) may be provided in addition to or in place of one or more CPUs. As described above, the computing environment 100 may include a secure element and/or other secured components or architecture.

System memory will typically include random access memory 130, but is more generally intended to encompass any type of non-transitory system memory such as static random access memory (SRAM), dynamic random access memory (DRAM), synchronous DRAM (SDRAM), read-only memory (ROM), or a combination thereof. Solid-state drive 120 is shown as an example of a mass storage device, but more generally such mass storage may comprise any type of non-transitory storage device configured to store data, programs, and other information, and to make the data, programs, and other information accessible via a system bus 160. For example, mass storage may comprise one or more of a solid state drive, hard disk drive, a magnetic disk drive, and/or an optical disk drive.

Communication between the various components of the computing environment 100 may be enabled by a system bus 160 comprising one or more internal and/or external buses (e.g., a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wired or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example the networking interface may implement specific physical layer and data link layer standards such as Ethernet, Fibre Channel, Wi-Fi, Token Ring or Serial communication protocols. The specific physical layer and the data link layer may provide a base for a full network protocol stack, allowing communication among small groups of computers on the same local area network (LAN) and large-scale network communications through routable protocols, such as Internet Protocol (IP).

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the computing device 100 in addition to or instead of the touchscreen 190.

According to some implementations of the present technology, the solid-state drive 120 stores program instructions suitable for being loaded into the random access memory 130 and executed by the processor 110 for executing acts of one or more methods described herein. For example, at least some of the program instructions may be part of a library or an application.

Secured Transaction Environment

Figure 2:
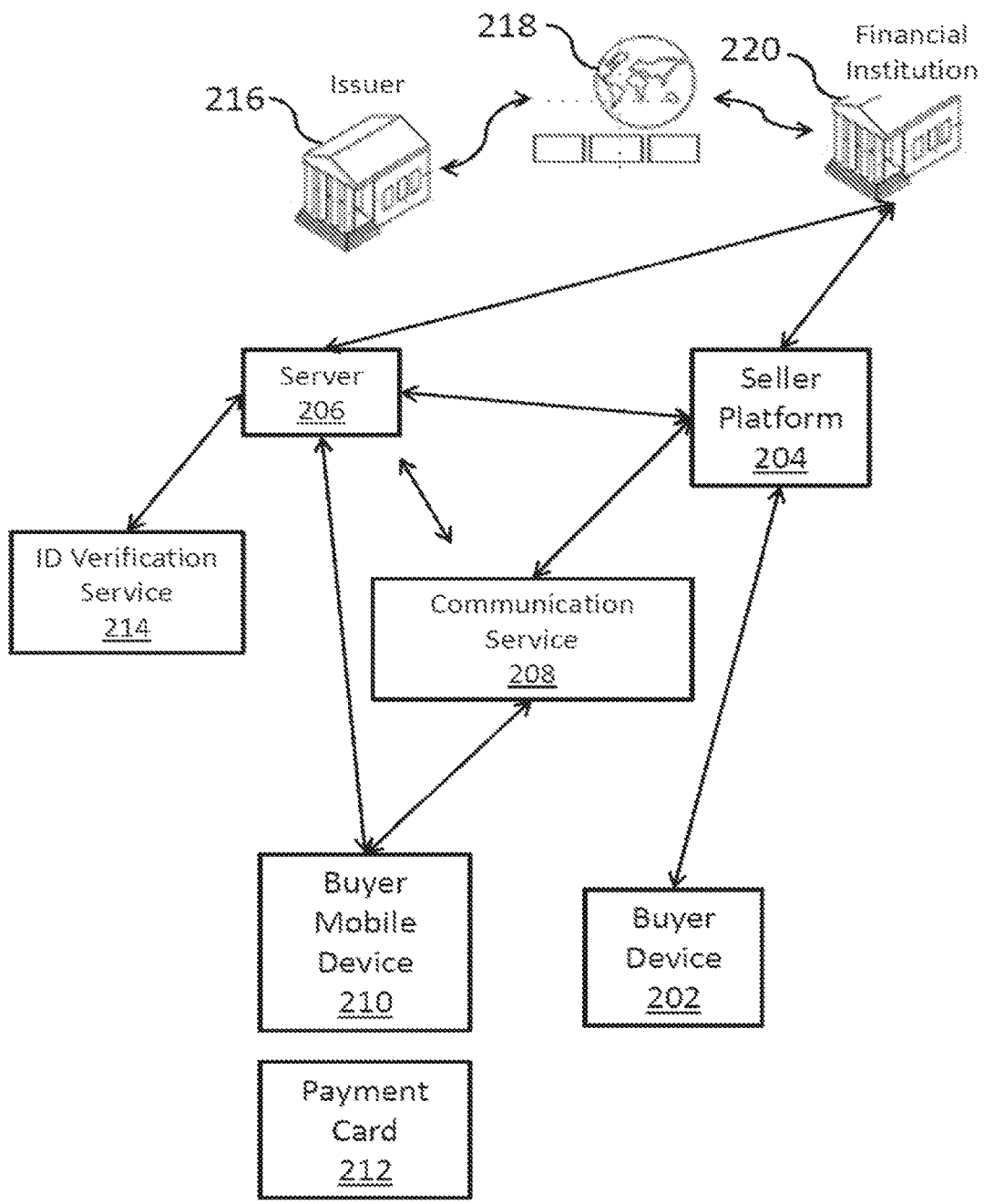
FIG. 2 is an illustration of an exemplary environment for operating a buyer's device as a payment device in accordance with embodiments of the present technology.

FIG. 2 is an illustration of an exemplary environment for operating a buyer's device as a payment device in accordance with embodiments of the present technology. The buyer may perform the transaction using a buyer device 202 and/or buyer mobile device 210. The buyer may interact with a seller platform 204. The buyer (equally referred to as a "consumer" or "customer") is associated with the buyer device 202 (equally referred to as a "consumer device" or "customer device") and/or a buyer mobile device 210

(equally referred to as a "consumer mobile device" or "customer mobile device"). In the illustrated embodiment, the seller platform 204 may be associated with an e-commerce platform or any platform for which products, content and/or services may be bought or accessed by the buyer.

The seller platform 204 may allow financial transactions to be completed between the buyer and the legal entity associated with the seller platform 204 (e.g. the seller). In the example of FIG. 2, the buyer is in a contractual relationship with an issuer 216, equally referred to as a financial institution holding a buyer's financial account. The issuer 216 may be a bank that maintains the customer's checking account and/or credit card account. In some embodiments, the issuer 216 may be an organization operating prepaid cards, debit cards and/or omnibus accounts that belong to a third party and the buyer has a card under that account. The issuer 216 may provide the buyer with a token to provide authentication during financial transactions. Such a token may be, for example, a payment card 212 and/or a secured unique identification component which may be embedded in the buyer device 202 and/or the buyer mobile device 210 (e.g. as a virtualized payment card in a mobile wallet), including but not limited to, a quick response (QR) code, a barcode, an alphanumeric code, an audible sound, an image, a NFC or Bluetooth communication, or any other audio/visual/digital 'token' which may be communicated between buyer device 202 or buyer mobile device 210 and the server 206. In some embodiments, the token may also contain any bio information about the buyer such as a finger print, a voice signature, an image identifier (ID), a retinal scan, etc.

The payment card 212 may be sanctioned by a payment card company 218 and may be, for example but without being limitative, a debit card from a regional payment scheme (such as the company Interac® or China Union Pay®) or a credit card from one of the credit card companies such as MasterCard®, Visa®, American Express®, JCB®, and Discover®. The payment card company 218 may be a scheme, such as the regional payment scheme, a card association, and/or any other type of payment card company. In some instances, the payment card company 218 and issuer 216 may be a same entity. The payment card 212 may adhere to specifications of the payment card company 218. The payment card 212 may be authorized for release by the payment card company 218. Other examples of a payment card 212 may be envisioned without departing from the scope of the present technology. The payment card 212 may embody data related to the buyer's financial account through a magnetic strip, a smart card chip and/or through a tag having radio frequency identification (RFID) circuitry. The tag including RFID circuitry may provide contactless transaction capabilities, in particular contactless transaction capabilities compliant with EMV standards and/or any other contactless payment standards (e.g. Visa Paywave®, MasterCard PayPass®, American Express ExpressPay®, Interac Flash®, Discover Zip®). The data related to the buyer's financial account may be any kind of data that allow a financial account to be identified during a transaction. For example, but without being limitative, such data may include keys, certificates, and payment card numbers. In some embodiments, the payment card numbers may be embodied as a primary account number (PAN). In some embodiments, the issuer 216 and/or payment card company 218 store data relating to the individual to which the payment card 212 is issued. Such information may include a cardholder name and/or an address associated with the individual.

In the illustrated embodiment, a legal entity associated with the seller platform 204 is in a contractual relationship with a financial institution 220 holding a seller's financial account (which may be referred to as an acquirer). The financial institution 220 may be a bank that maintains the seller's checking account or credit card account which may interact with the payment card company 218. The financial institution 220 may allow the seller to conduct financial transactions through a server 206. In some embodiments, the server 206 may manage payment devices (equally referred to as payment applets) and/or the conduct of transactions for payment acceptance by the seller. For example the server 206 may implement the Hive™ platform from Mobeewave.

In accordance with embodiments of the present technology, the server 206 may interact with an identification (ID) verification service 214 and a communication service 208. In some embodiments, the communication service 208 may implement a short message service (SMS service). As an example, but without being limitative, the ID verification service 214 may be embodied as the PayFone™ or Whitepages Pro™ API. The ID verification service 214 may allow retrieving a name and/or an address associated with a phone number or a phone ID. As an example, the communication service 208 may allow automatic sending of SMS messages. As an example, but without being limitative, the communication service 208 may be embodied as the Twilio™ SMS API.

In some alternative embodiments, the ID verification service 214 may be operated by the server 206 which may communicate with one or more mobile operators and/or one or more device vendors of the buyer device 202 or the buyer mobile device 210 (e.g., Apple, Samsung, etc.) to obtain certain information. In some embodiments, the information may comprise a duration of how long the buyer device 202 or the buyer mobile device 210 has been held by and/or associated with the buyer, location information, human behavior information that the one or more mobile operators may have collected about the buyer, mobile phone bill information and/or buying history (e.g., apps buying history). The information may be leveraged and/or compiled by the server 206 to add an additional level of security allowing confirming that the buyer is the actual owner of the buyer device 202 and/or the buyer mobile device 210 and/or that the buyer is the individual associated with the buyer device 202 or the buyer mobile device 210. Other alternatives may also be envisioned, such as alternative approaches leveraging biometric information about the buyer, analytics, social physics based on large amount of behavioral data combined with the use of machine learning algorithms to provide high accuracy and matching name and/or address with the mobile phone number or mobile phone ID.

In some embodiments, the operator of the server 206 may manage a risk associated with the transaction and may therefore charge a higher transaction fee to the seller platform 204 and/or entity related to the seller platform 204 (i.e. the seller). By lowering the risk of fraud, the operator of the server 206 may be able to negotiate a lower fee to be paid to the payment card company 218. The server 206 may manage the risk based on the information collected from the one or more mobile operators and/or the one or more device vendors of the buyer device 202 or the buyer mobile device 210. In some embodiments, the server 206 may also provide the payment card company 218 with data generated from the collected information so as to allow the payment card company 218 to arbitrate potential chargebacks.

The buyer device 202, may be a laptop or a tablet (such as, but without being limitative a Galaxy™ from Samsung Inc., or an iPad™ from Apple Inc.) operating a web browser and/or an application (app) associated with the seller platform 204.

The buyer mobile device 210, may be a mobile device, such as a phone or a tablet (such as, but without being limitative a Galaxy™ from Samsung Inc., an iPhone™ or an iPad™ from Apple Inc.) which may be configured to operate a transaction mechanism, such as, but without being limitative, a payment applet and/or point of sale (POS) application which allows the buyer mobile device 210 to operate as a payment device (e.g. payment terminal). The payment applet may be integrated within the POS application. The POS application and/or payment applet may be integrated within the operating system of the buyer mobile device 210. In some embodiments, installation and/or operation of the POS application and/or payment applet may occur after a predetermined event, such as, but without being limitative, a determination that the buyer is ready to proceed to a reading of her/his payment card by the buyer mobile device 210. The POS application and/or payment applet may allow the buyer mobile device 210 to operate as a payment device of the seller even though the buyer mobile device 210 is not a dedicated payment device. The POS application and/or payment applet may be temporarily installed and/or activated remotely by the server 206. In some embodiments, the POS application and/or payment applet may be enabled by the Bee™ technology from Mobeewave. The POS application and/or payment applet may enable secured financial transactions by operating certain software modules on an isolated secured area of the processor and/or a secure element of the buyer mobile device 210.

The server 206 may transmit a configuration for the POS application and/or payment applet to the buyer mobile device 210. The configuration may include a transaction amount (price), name of the seller, image corresponding to the seller, other text corresponding to the seller, an identifier of the seller (such as a merchant ID), a terminal identifier (terminal ID), and/or any other data related to the transaction. The POS application and/or payment applet may use this configuration data to perform the transaction. The POS application and/or payment applet may allow the buyer mobile device 210 to contactlessly acquire payment card data from a payment instrument via a near field communication (NFC) interface. The payment instrument may be a contactless payment card, such as the payment card 212, or a device emulating a contactless payment card (e.g., a device operating Apple Pay™ or Samsung Pay™) associated with the buyer. The POS application and/or payment applet may acquire a token from a mobile wallet installed on the buyer mobile device 210. The token may be acquired from the mobile wallet without using NFC. The data acquired from the payment instrument may be a PAN. It should be understood that when referring to a payment card herein, any other payment instrument may be used instead of or in addition to a payment card such as a mobile device executing a mobile wallet.

Once acquired, the payment card data may be securely transmitted to the server 206. The server 206 may execute various steps in collaboration with the ID verification service 214, the communication service 208, the buyer device 202 and/or the buyer mobile device 210 to securely complete a financial transaction between the seller and the buyer. The issuer 216 may approve or decline the transaction. The issuer 216 may determine the amount of funds in the buyer's financial account and determine whether to approve or decline the transaction based on the amount of funds. If the buyer has insufficient funds, the issuer 216 may decline the transaction. If the buyer has sufficient funds, the issuer 216 may approve the transaction. The request for approval may be routed to the issuer 216 via the payment card company 218 and/or financial institution 220. In some embodiments, the buyer mobile device 210 is associated with one or more unique identifiers (ID). Examples of unique IDs may comprise a mobile phone number, a MAC address, a serial number, an ID associated with an operating system (OS) installed on the buyer mobile device 210.

Figure 3:
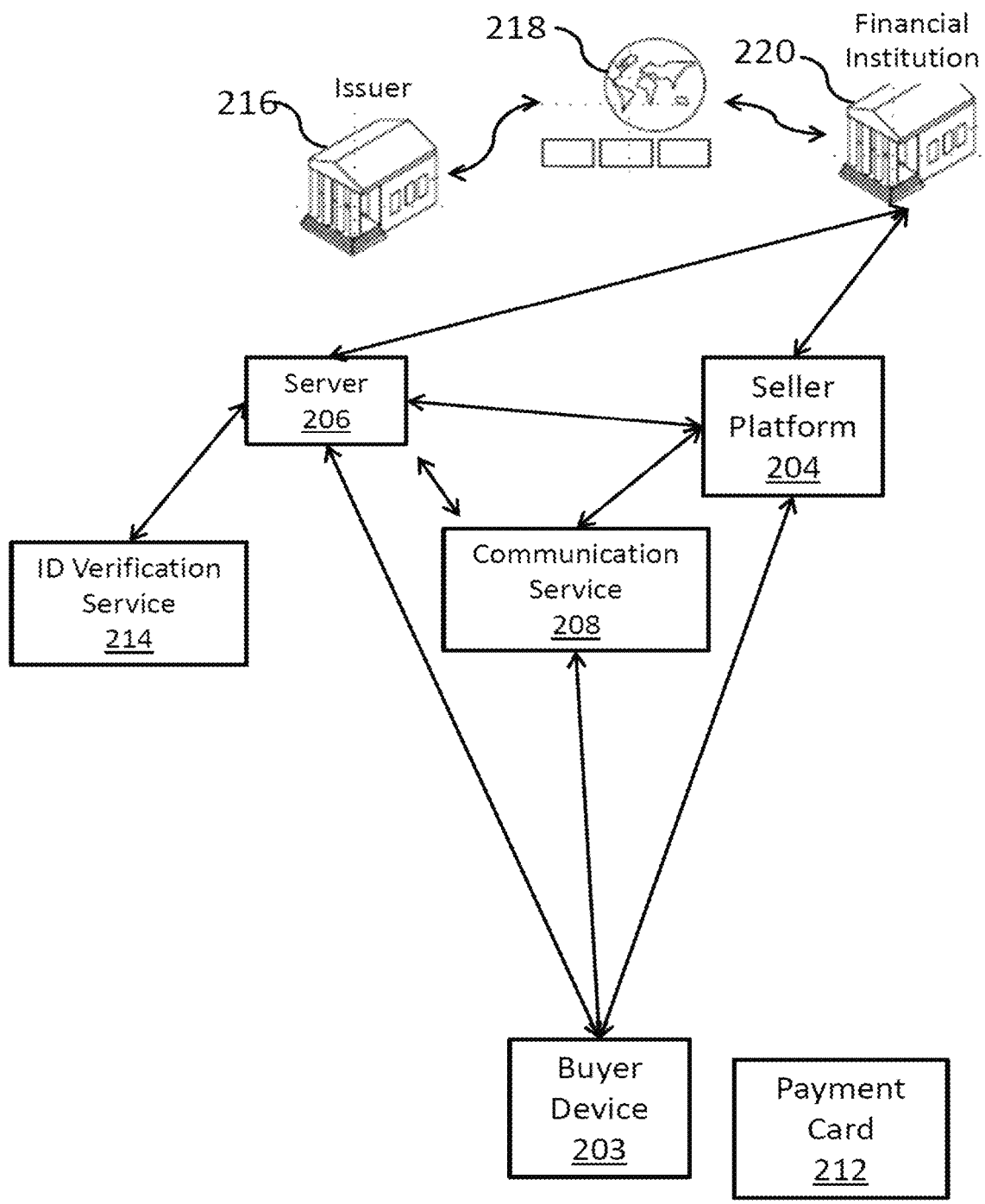
FIG. 3 is an illustration of another exemplary environment for operating a buyer's device as a payment device in accordance with embodiments of the present technology.

In alternative embodiments, such as the embodiment illustrated in FIG. 3, the buyer device 202 and the buyer mobile device 210 may be implemented as a single device, referred to as a buyer device 203 in FIG. 3. In this embodiment, the buyer device 203 may be used to make a purchase from the seller, such as by accessing the seller's website and/or an application associated with the seller. After requesting to complete the transaction, configuration data may be transmitted to the buyer device 203, such as from the server 206. The configuration data may cause a POS application executed by the buyer device 203, such as a payment applet, to output a request to the buyer to present the payment card 212 to the buyer device 203. The buyer device 203 may then use a contactless interface, such as NFC, to read payment card data from the payment card 212. The payment card data may then be transmitted, such as to the server 206, to complete the transaction. Rather than using a payment card 212 to complete the transaction, a mobile wallet installed on the buyer device 203 may be used to complete the transaction. If a mobile wallet is used, the mobile wallet may generate a token after receiving authorization from the buyer, such as after the buyer enters a passcode and/or completes a biometric authentication. The token may then be transmitted to complete the transaction, such as to the server 206.

Secured Transaction Communications

Figure 4:
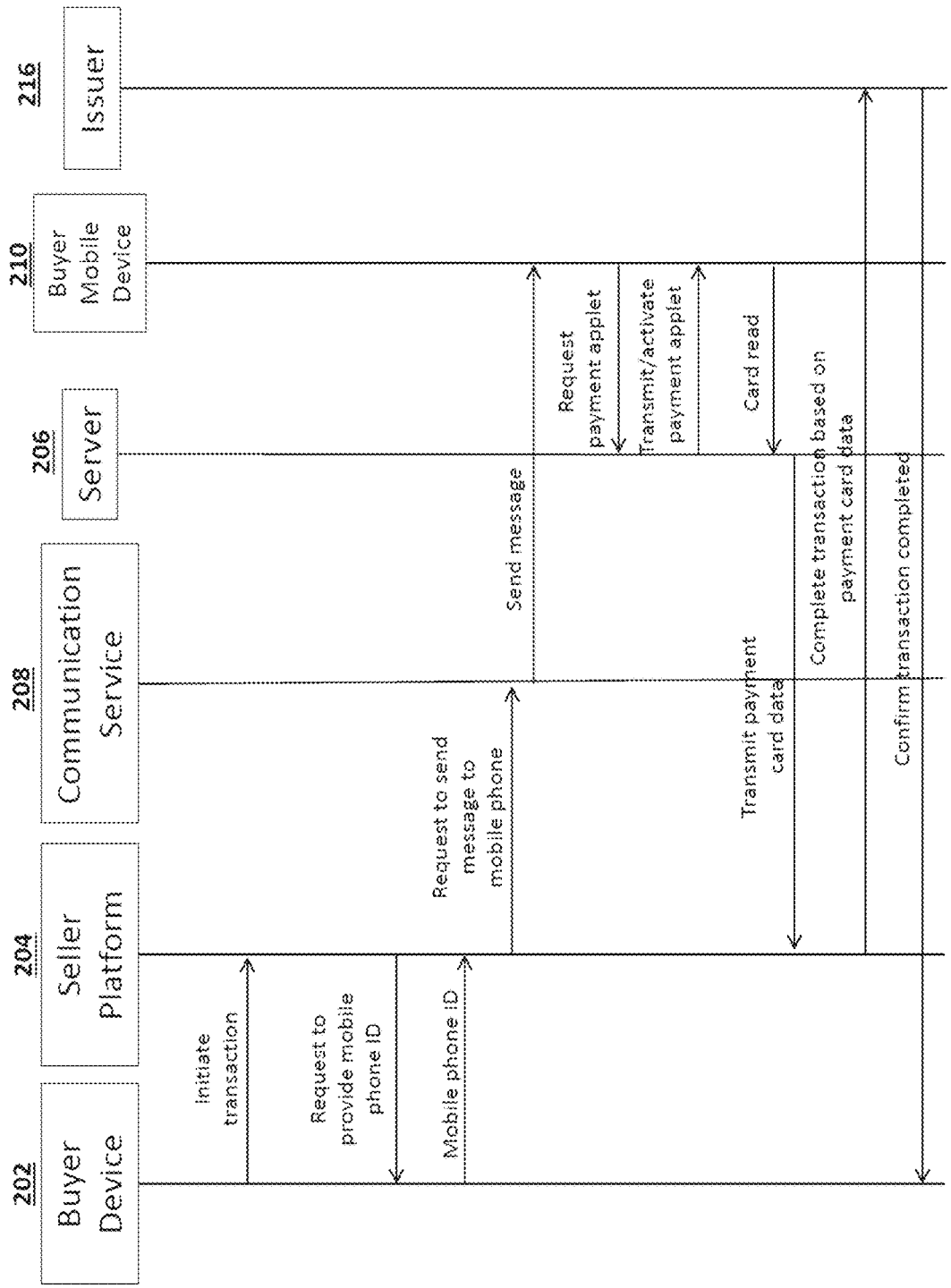
FIG. 4 is a diagram of communications flows between several entities for operating a buyer's device as a payment device in accordance with embodiments of the present technology.

FIG. 4 is a diagram of communications flows between several entities for operating a buyer's device as a payment device in accordance with embodiments of the present technology. FIG. 4 illustrates communication flows between several entities for operating a consumer device as a payment device, such as a POS terminal of the seller, thereby allowing completion of a transaction between a buyer and a seller platform.

As discussed above, CP transactions typically present a lesser risk of fraud than CnP transactions as the buyer should be in physical possession of the payment card (or payment method such as a mobile device implementing a mobile wallet) to perform a CP transaction. In some embodiments, the added security enabled by CP transactions lies in the fact that a chip is used to generate a code that is configured to be generated solely by the payment card and can be verified by the issuing institution. This code will change for each transaction, therefore the transaction data may not be copied and reused. In some embodiments, the code generated by the chip of the payment card may include dynamic, verifiable code (e.g., a cryptogram) which can solely be accessed through a physical interaction with the payment card.

The methods described herein may allow a buyer to operate a consumer device as a payment device, thereby allowing an online or remote transaction between a buyer and a seller to be processed as a CP transaction (and not as CnP transaction). The payment device (e.g. buyer's mobile device) may be configured to act as a payment device of the seller. The methods described herein may reduce risks of fraud and/or reduce processing fees associated with the transaction.

In accordance with the flowchart representation of FIG. 4, a buyer initiates, through the buyer device 202, a transaction with the seller platform 204. Initiation of the transaction may be triggered by a checkout action after an online shopping session on the seller platform 204 which the buyer has conducted via the buyer device 202 (either through a dedicated app associated with the seller platform 204 or through a web browser). Upon initiating the transaction, the seller platform 204 transmits, to the buyer device 202, a request to provide a mobile device ID. In some embodiments, the mobile device ID may be a mobile phone number associated with the buyer (i.e., a mobile phone number associated with the buyer mobile device 210). The buyer, using the buyer device 202, provides the mobile phone number to the seller platform 204. Other embodiments may also be envisioned, such as an email to be opened on the buyer mobile device 210 or an audio tone generated by the seller platform 204 which is then received by the buyer mobile device 210 providing that the buyer mobile device 210 has an app to receive and decipher such a sound—e.g. an OS of the buyer mobile device 210 having a built-in decipher application. Other embodiments may also include a code to be entered on a website accessed through the buyer mobile device 210, a QR code to scan on the seller site by the buyer mobile device 210, etc. The seller platform 204 may already be aware of the mobile device ID or other identifying information of the buyer, such as if the buyer has previously engaged in a transaction with the seller and/or if the buyer is logged in to an account at the seller. In that case, the seller platform 204 may retrieve the mobile device ID and/or other identifying information associated with the buyer.

After the mobile phone number is received by the seller platform 204, the seller platform 204 transmits the mobile phone number to the communication service 208. In some embodiments, the seller platform 204 may also transmit the mobile phone number to the ID verification service 214 (not illustrated in FIG. 4) to validate additional information based on the mobile phone number, such as a validation of a name of a cardholder or a validation of a name associated with the mobile phone number.

The communication service 208 may transmit a message (e.g., an SMS message, a notification, an email, etc.) to the buyer mobile device 210. The message may be transmitted based on the mobile phone number and/or any other identifier corresponding to the buyer mobile device 210, such as a device ID or application ID. The message may comprise a hyperlink and/or executable content which may be clicked and/or activated by the buyer after being received by the buyer mobile device 210. In some embodiments, selecting the hyperlink included in the message causes the mobile device 210 to send a request to obtain a payment applet, such as from the server 206. In some embodiments, the sending of the request may also comprise a request to obtain a configuration for conducting a transaction via the payment applet (e.g., an identifier of a transaction, an amount of the transaction, a particular configuration of the payment applet etc.). After receiving the request to obtain the payment applet, the server 206 may transmit and/or remotely install and provision the payment applet on the buyer mobile device 210. In some embodiments, the payment applet may be preinstalled on the buyer mobile device 210 (e.g., be part of the OS of the buyer mobile device 210 and/or be preinstalled by the OS). In some embodiments, if the payment applet is preinstalled, the server 206 might transmit data relating to a configuration to be used by the payment applet to conduct the transaction, instead of transmitting the entire payment applet. In some embodiments, data relating to the configuration to be used by the payment applet may be pushed via push notification or acquired through a reading, by the buyer mobile device 210, of a QR code. Although described herein as a payment applet, it should be understood that a POS application or other payment module may be used.

The payment applet, once installed and provisioned (and/or configured as the case may be), allows the buyer mobile device 210 to temporarily (e.g., for a predetermined number of transactions and/or for a predetermined amount of time), or permanently in some embodiments, operate as a mobile point of sale (mPOS) terminal for the seller. The mPOS may use an NFC interface of the buyer mobile device 210 to contactlessly read payment card information (e.g., the PAN and/or other information associated with the payment card). The mPOS may acquire a payment token from the buyer mobile device 210, such as from a mobile wallet of the buyer mobile device 210.

The payment applet may be installed temporarily or permanently on the buyer mobile device 210. The buyer may be prompted by the payment applet to present her/his payment card to the buyer mobile device 210 to allow proper reading of the payment card information as the buyer would normally do upon completing a CP transaction with a payment device associated with the seller. The buyer may be prompted to perform a transaction via a mobile wallet on the buyer mobile device 210, such as by entering a pass code and/or performing a biometric authentication. In some embodiments, the payment card information may include dynamic, verifiable code (e.g., a cryptogram) which is intended to solely be accessed through a physical interaction with the payment card. In some embodiments, the payment applet may also display, on the buyer mobile device 210, information associated with the transaction, such as an identifier associated with the transaction, a seller platform associated with the transaction, an amount associated with the transaction, text provided by the seller, an image provided by the seller, etc. In some embodiments, the information associated with the transaction may be transmitted to the payment applet by the server 206 and/or the seller platform 204. After reading payment card information from the payment card, the payment applet causes all or a portion of the read payment card data to be transmitted to the server 206. The payment card information may be encrypted prior to transmission to the server 206. In some embodiments, the payment card information may be acquired by the secure element and/or TEE running on a processor of the buyer mobile device 210 before being encrypted and transmitted to the server 206. The payment applet may cause other information to be transmitted to the server 206, such as a terminal ID. The terminal ID may be determined by the mobile device and/or may be assigned. The terminal ID may be received by the mobile device in the transaction data configuring the payment applet.

After receiving the payment card data from the buyer mobile device 210, the server 206 may transmit the payment card data to the seller platform 204. The seller platform 204 may use the payment card data to complete the financial transaction with one or more of the financial institution 220, the payment card company 218, the issuer 216, and/or any other entity related to payment processing. In some embodiments, the server 206 and/or the seller platform 204 may manage an identifier (ID) and/or an amount associated with the transaction which may be sent along with the payment card information to complete the financial transaction. As the payment card information has been physically read from the payment card via the payment applet running on the buyer mobile device 210, the transaction may be deemed to be a CP transaction. If a mobile wallet is used to perform the transaction, a token may be received. The token may be a CP token. In some embodiments, the payment card information may include dynamic, verifiable code (e.g., a cryptogram) which can solely be accessed through a physical interaction with the payment card. In some embodiments, the seller platform 204 may cause the payment card data to be securely stored so that the seller platform 204 may complete recurring transactions based on the payment card data (e.g., charge a weekly or monthly subscription fee) without further action from the buyer (after having obtained her/his consent for conducting recurrent transactions upon reading the payment card data).

In some alternative embodiments, the seller platform 204 does not receive nor manage the payment card data but rather relies on a third party server (such as the server 206) to store the payment card data and manage conducting transactions. In some embodiments, after completing a transaction, the issuer 216 may transmit a notification indicating a transaction result to the server 206, the seller platform 204, the buyer mobile device 210, the buyer device 202, and/or any other device associated with the transaction that the transaction has been completed. The transaction result may indicate that the transaction was approved, declined, that the payment card is indicated to be a stolen card, and/or any other transaction result.

In some alternative embodiments, if the transmitting of the payment card data to the seller platform 204 results in the CP transaction being declined, the seller platform 204 may revert back to the conduct of a CnP transaction based on payment data provided by the buyer, or based on previously stored payment data accessible to the seller platform 204. In that case, the higher fees associated with a CnP transaction may be charged to the seller.

Transaction Methods

Figure 5:
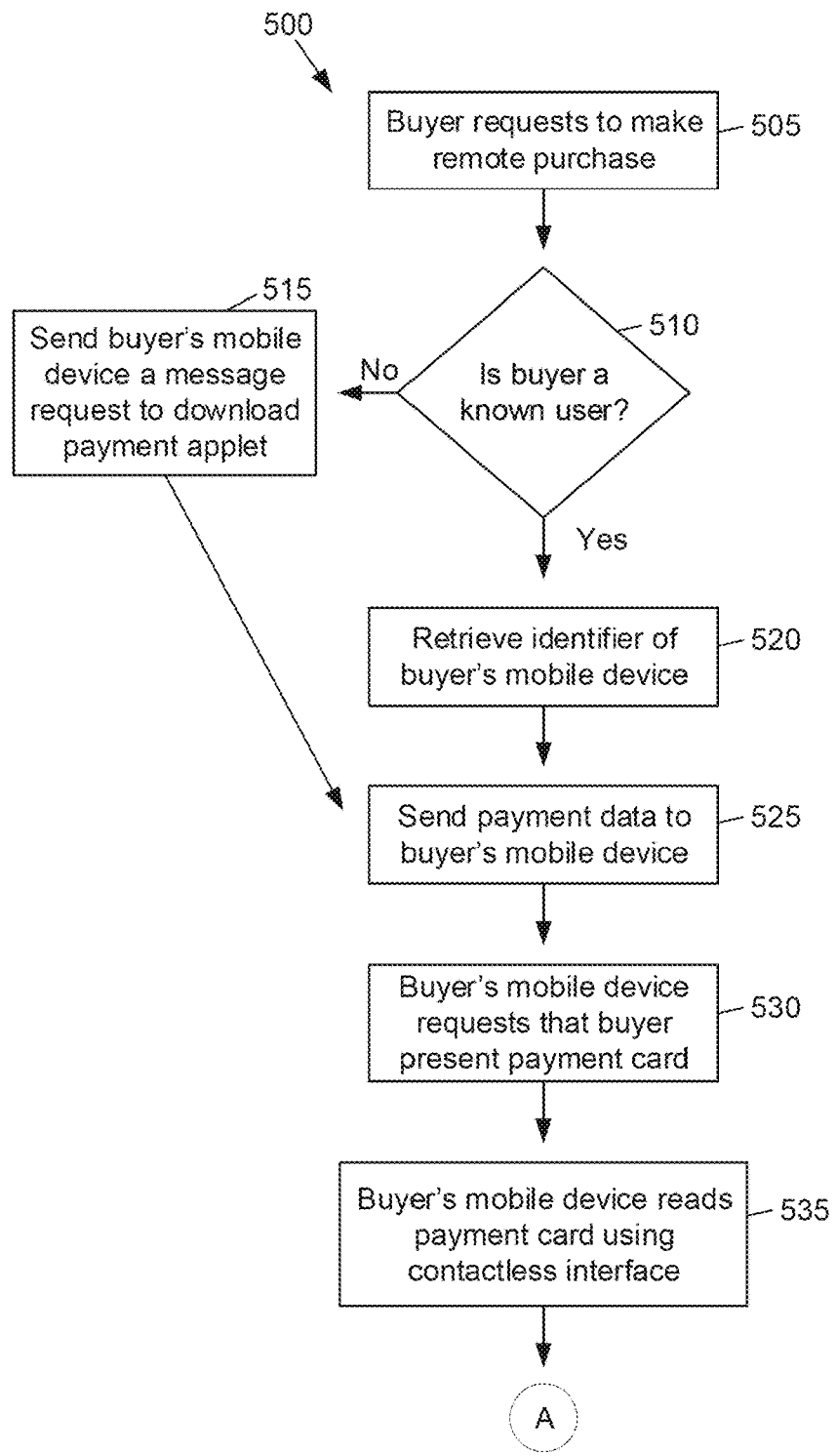
FIGS. 5 and 6 illustrate a flow diagram of a method for providing payment for a transaction in accordance with various embodiments of the present technology.
Figure 6:
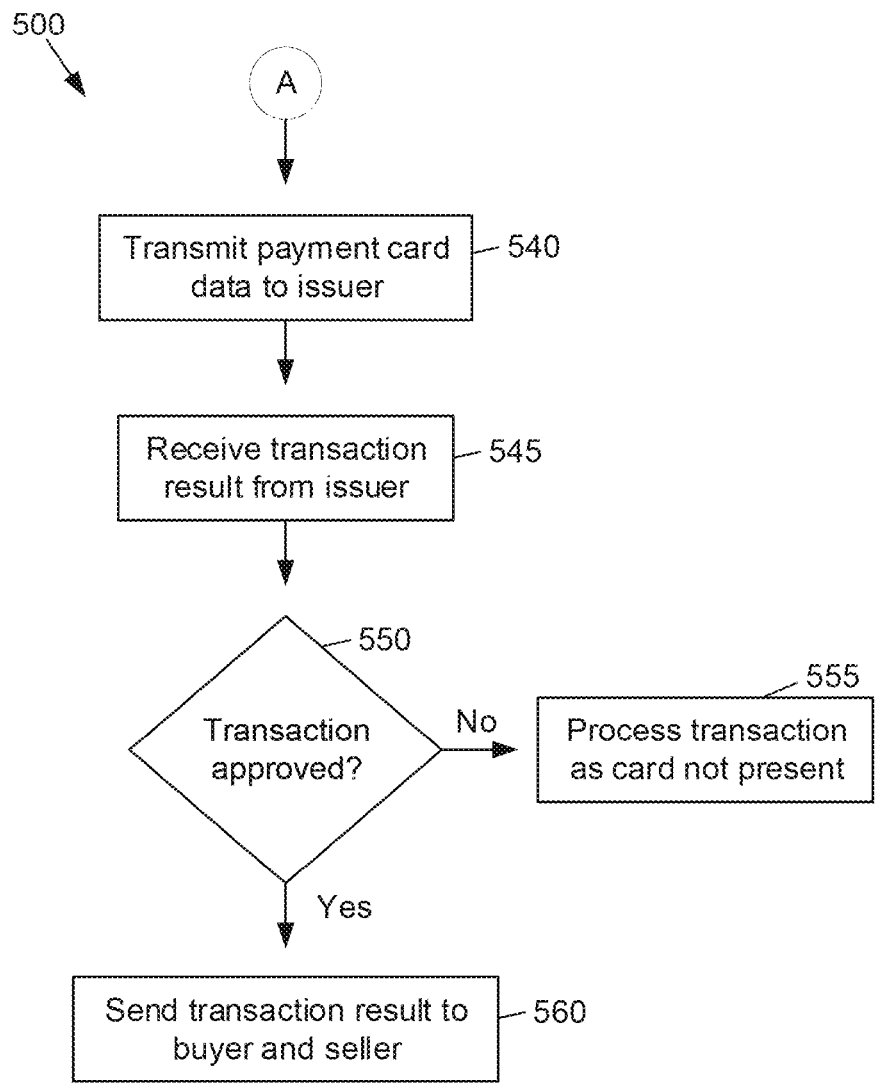

FIGS. 5 and 6 illustrate a flow diagram of a method 500 for providing payment for a transaction in accordance with various embodiments of the present technology. All or portions of the method 500 may be executed by all or a portion of the devices illustrated in FIGS. 2 and 3. In one or more aspects, the method 500 or one or more steps thereof may be performed by a computing system, such as the computing environment 100. The method 500 or one or more steps thereof may be embodied in computer-executable instructions that are stored in a computer-readable medium, such as a non-transitory mass storage device, loaded into memory and executed by a CPU. The method 500 is exemplary, and it should be understood that some steps or portions of steps in the flow diagram may be omitted and/or changed in order.

At step 505 a buyer may request to make a purchase. The buyer may request to make the purchase via a platform of the seller. The buyer may request to make the purchase using a website of the seller, an application of the seller, and/or any other method for performing a purchase. The buyer may be remote from the seller rather than being present in a physical location of the seller, such as a retail store of the seller.

To complete the transaction, the buyer may enter their address, name, telephone number, e-mail address, payment card information, and/or any other information related to the buyer. In some instances all or a portion of the buyer's information may be automatically populated, such as if the buyer's information is saved on the device the buyer is using to make the purchase and/or if the buyer has a pre-existing account with the seller's platform.

After the buyer has requested to make the purchase, a payment request may be generated and/or transmitted. The payment request may be sent to a server, such as the server 206. The payment request may include a transaction amount, text provided by the seller, one or more imaged, and/or an identifier of the seller such as a merchant ID, application programming interface (API) key assigned to the seller, and/or name of the seller.

At step 510 the seller platform may determine whether the buyer is a known user. The seller platform may have previously acquired data corresponding to the buyer, such as an email address, telephone number, payment card data, a mobile device ID, an application ID, address, and/or any other data corresponding to the user. The buyer may have an account at the seller platform. The seller platform may determine whether the buyer's mobile device has a payment applet, POS application, and/or application of the seller installed on the mobile device.

If the buyer is not a known user, at step 515 a message may be sent to the buyer's mobile device. The message may request that the buyer download a payment applet, POS application, and/or any other application for making a payment. The message may be a text message, notification, email, and/or any other type of message. If the buyer requested to make the purchase at step 505 on their mobile device, the message may be displayed to the buyer by the seller's website.

A payment applet may be installed on the mobile device after receiving the message at step 515, or may be preinstalled on the buyer mobile device. The payment applet may be configured for the specific purpose of completing the financial transaction.

If the buyer is determined at step 510 to be a known user, an identifier of the buyer's mobile device may be retrieved at step 520. The identifier may be a device ID, application ID, telephone number associated with the mobile device, and/or any other identifier corresponding to the mobile device. If the buyer is known to have the payment applet already installed on their mobile device, the method may proceed to step 525. Otherwise, the method may proceed to step 515 or otherwise cause the payment applet to be installed on the buyer's mobile device.

At step 525 payment data may be sent to the buyer's mobile device. The payment data may be sent to an application and/or applet of the buyer's mobile device. The payment data may be sent by a server associated with the seller, a website associated with the seller, a server associated with the OS of the mobile device, and/or by any other device. The payment data may include configuration data for the payment applet. The payment data may include a transaction amount, identifier of the seller, text, one or more images, and/or any other data related to the transaction. The payment data may indicate where the transaction should be paid, such as a financial account of the seller. The payment data may configure the payment applet to read a payment card of the buyer. The payment data may include data related to the seller, such as an encryption key corresponding to the seller and/or an entity related to the seller. The encryption key may be used to encrypt all, or a portion, of the data being transmitted at step 540, described below. The seller, or an entity related to the seller, may maintain a key corresponding to the encryption key. The seller's key may be used to decrypt the encrypted data.

At step 530 the buyer's mobile device may request that the buyer present a payment card to the buyer's mobile device. Receipt of the payment data may cause the buyer's mobile device to display the request. A message may be displayed, an interface may be displayed, a notification may be displayed, and/or any other indication may be displayed to the user to request that the user place their payment card near the mobile device so that their mobile device can contactlessly read payment card data from the payment card. The request may be displayed by an OS of the mobile device, by the payment applet, by a POS application, and/or by an application associated with the seller.

At step 535 the buyer's mobile device may read payment card data. The payment card data may be captured from a payment card and/or any other type of payment device, such as a mobile device executing a mobile wallet. The payment card data may be acquired via a contactless interface, such as an NFC reader of the mobile device. The payment card data may be acquired by the payment applet. The payment card data may include any information related to the payment card, such as payment card number, expiration date, name associated with the payment card, and/or any other data. The payment card data may include dynamic, verifiable code (e.g., a cryptogram) which can solely be accessed through a physical interaction with the payment card.

The buyer's mobile device may allow the buyer to split a payment, so that the payment can be made using two or more payment cards. The user may be able to select the number of payment cards and/or amount of the total to be paid by each payment card. Each payment card may then be presented to the mobile device so that the mobile device can acquire payment data from each of the payment cards.

At step 540 the payment card data may be transmitted. The payment card data may be transmitted to a server of the issuer and/or any other entity for performing a transaction. All or a portion of the payment card data may be transmitted. A terminal ID, identifier of the mobile device, data identifying the buyer, data identifying the seller, transaction amount, and/or any other data associated with the transaction may be transmitted.

At step 545 a transaction result may be received. The transaction result may be received from a server associated with the issuer and/or any other entity related to the transaction. The transaction result may indicate that the transaction was approved or declined. The transaction result may indicate a reason that the transaction was approved or declined. For example the transaction result may indicate that the payment card data is associated with a stolen payment card.

At step 550 a determination may be made as to whether the transaction was approved. If the transaction was approved, a notification of the transaction result may be transmitted at step 560. The transaction may be performed as a CP transaction. The notification may indicate that the transaction was approved. The notification may be sent to the buyer's mobile device, any other device associated with the buyer, any device associated with the seller, and/or any other device associated with the transaction.

If the transaction was declined, at step 555 the transaction may be processed as a CnP transaction. The seller may determine whether to process the transaction as a CnP transaction or to simply decline the transaction. If the seller decides to decline the transaction, or if the CnP transaction is declined, an indication that the transaction was declined may be sent to the buyer's mobile device, any other device associated with the buyer, any device associated with the seller, and/or any other device associated with the transaction. If the CnP transaction is approved, the indication may indicate that the transaction was approved.

The method 500 may be used to perform a transaction between a buyer, a seller, and an intermediary. For example the intermediary may be a marketplace that facilitates a transaction between the buyer and the seller. In another example the intermediary may be a food-delivery service that facilitates a transaction between the buyer and the seller (the restaurant). Devices associated with the intermediary may perform all or a portion of the steps in the method 500. When the payment data is sent to the buyer's mobile device at step 525, the payment data may include an indicator of the seller, such as an indication of a financial account of the seller. The payment may then be directed to the financial account of the seller. If the seller owes a fee to the intermediary, the seller may pay the fee later.

Figure 7:
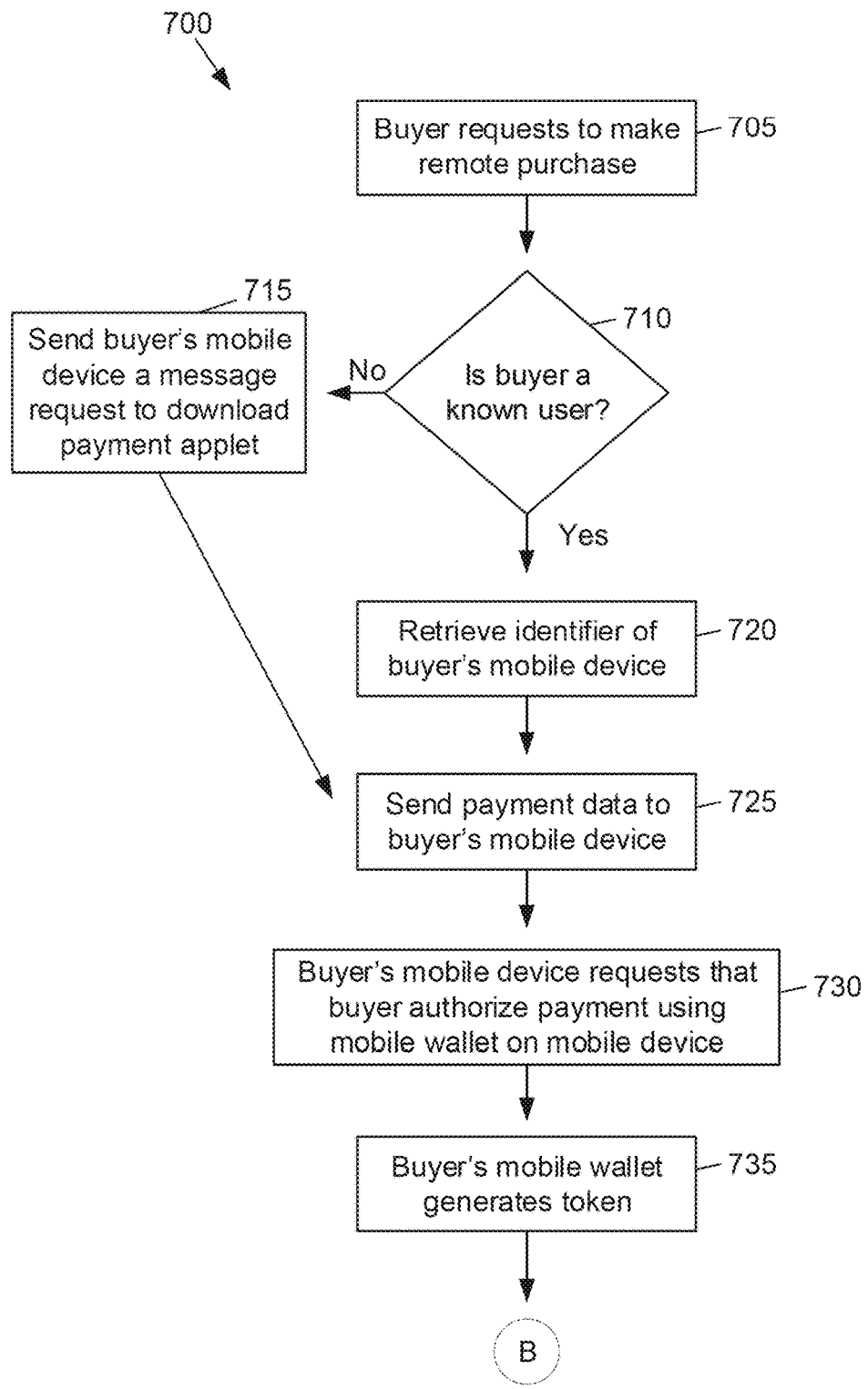
FIGS. 7 and 8 illustrate a flow diagram of a method for providing payment using a mobile wallet for a transaction in accordance with embodiments of the present technology.
Figure 8:
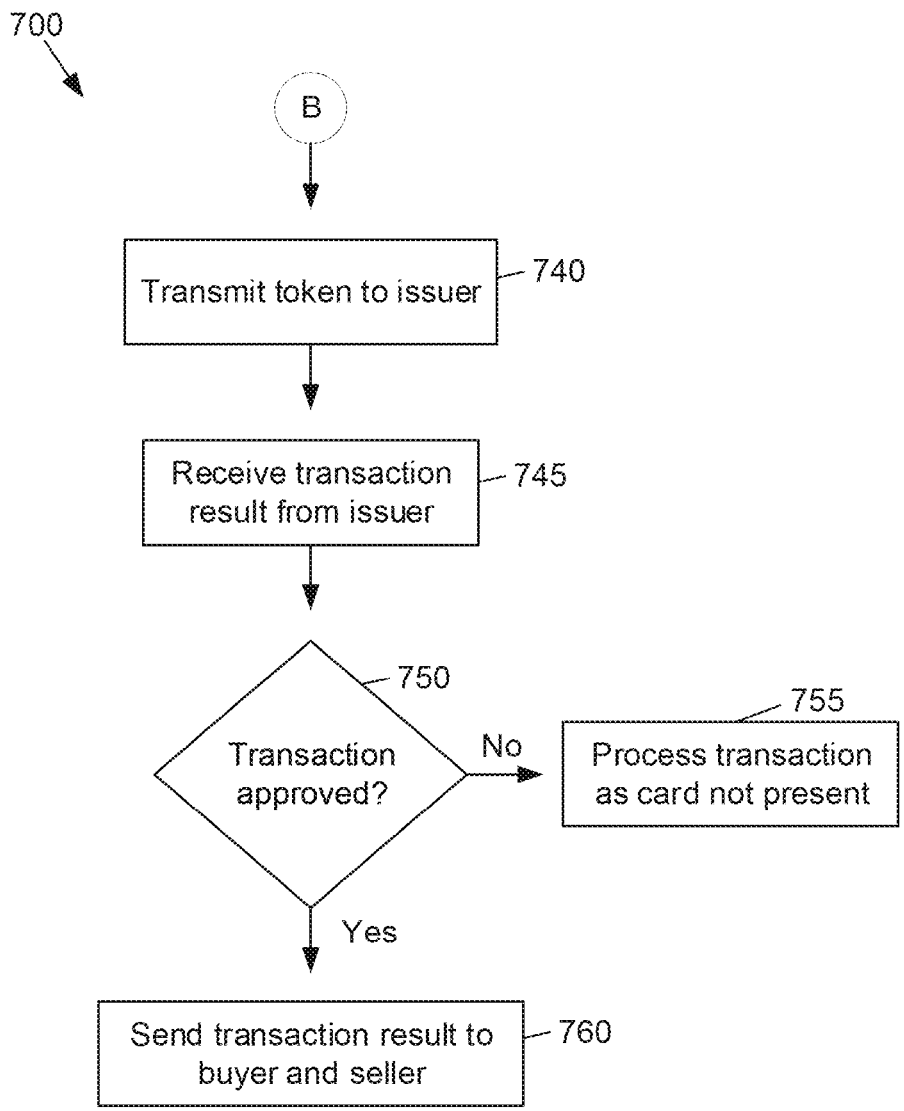

FIGS. 7 and 8 illustrate a flow diagram of a method 700 for providing payment using a mobile wallet for a transaction in accordance with various embodiments of the present technology. All or portions of the method 700 may be executed by all or a portion of the devices illustrated in FIGS. 2 and 3. In one or more aspects, the method 700 or one or more steps thereof may be performed by a computing system, such as the computing environment 100. The method 700 or one or more steps thereof may be embodied in computer-executable instructions that are stored in a computer-readable medium, such as a non-transitory mass storage device, loaded into memory and executed by a CPU. The method 700 is exemplary, and it should be understood that some steps or portions of steps in the flow diagram may be omitted and/or changed in order.

The method 700 may be similar to the method 500 described above, but in the method 700 a mobile wallet executed by the buyer's mobile device may be used to complete the transaction. At steps 705 to 725 a buyer may request to make a purchase and payment data may be sent to the buyer's mobile device. Steps 705 to 725 are similar to steps 505 to 525 of the method 500. The actions performed at steps 705 to 725 may be the same as actions performed at steps 505 to 525.

At step 730 the buyer's mobile device may request that the buyer authorize payment using a mobile wallet of the buyer's mobile device. The mobile wallet may be integrated in the OS of the buyer's mobile device. The buyer may approve the transaction by entering a passcode, performing a biometric authentication, and/or any other authentication method.

At step 735 the mobile wallet may generate a token. The token may be a payment token. The token may indicate that it corresponds to a CP transaction. The token may include payment card data, such as an account number, information identifying the buyer, and/or any other data related to the transaction.

At step 740 the token may be transmitted. The token may be transmitted to the issuer and/or any other entity for processing the transaction. Steps 745 to 760 are similar to steps 545 to 560 and actions performed at steps 745 to 760 may be similar to those performed at steps 545 to 560. If the transaction is approved, the transaction performed by the method 700 may be processed as a CP transaction.

Interfaces

Figure 9:
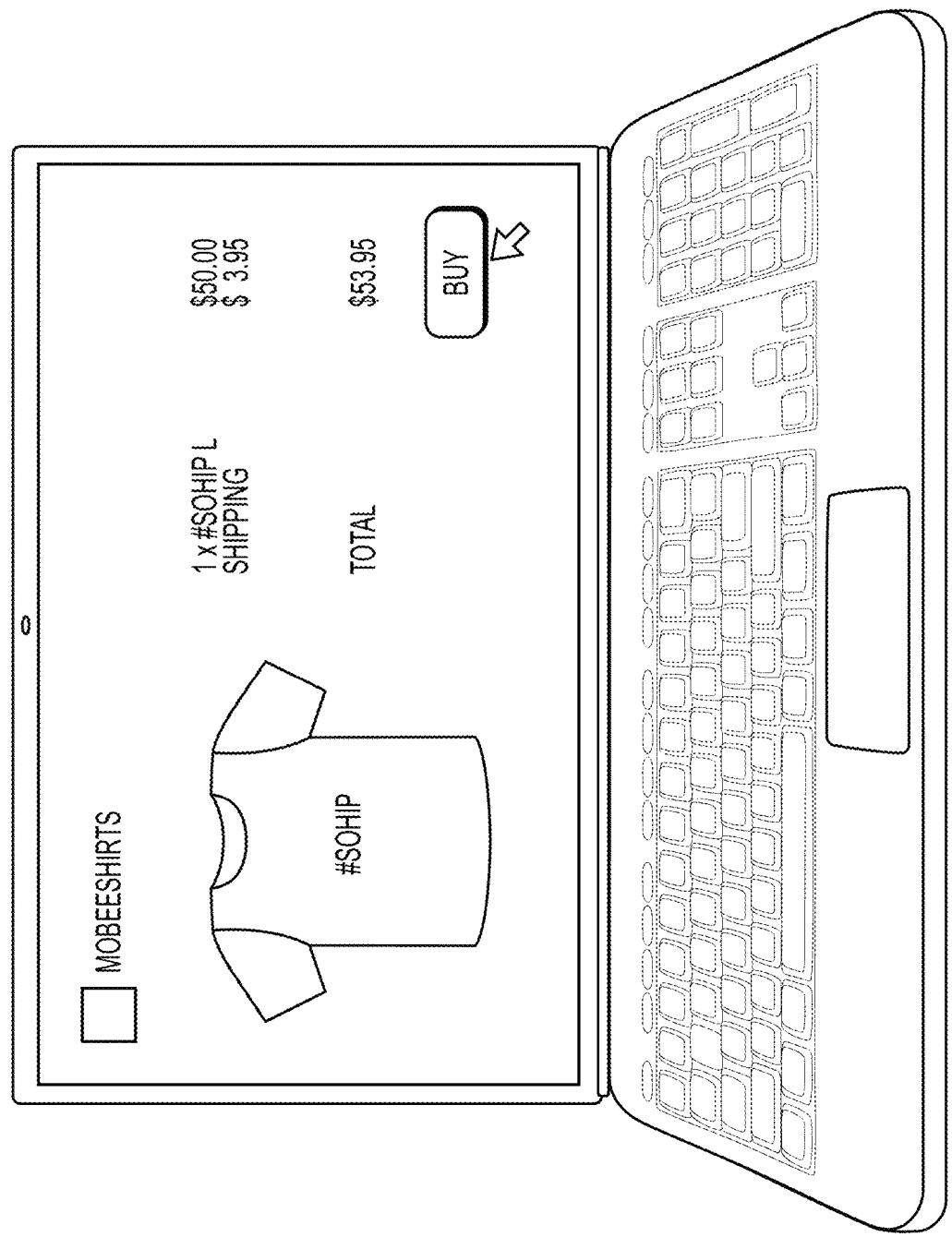
FIGS. 9 to 15 illustrate exemplary embodiments of graphical user interfaces (GUIs) implementing the present technology.
Figure 10:
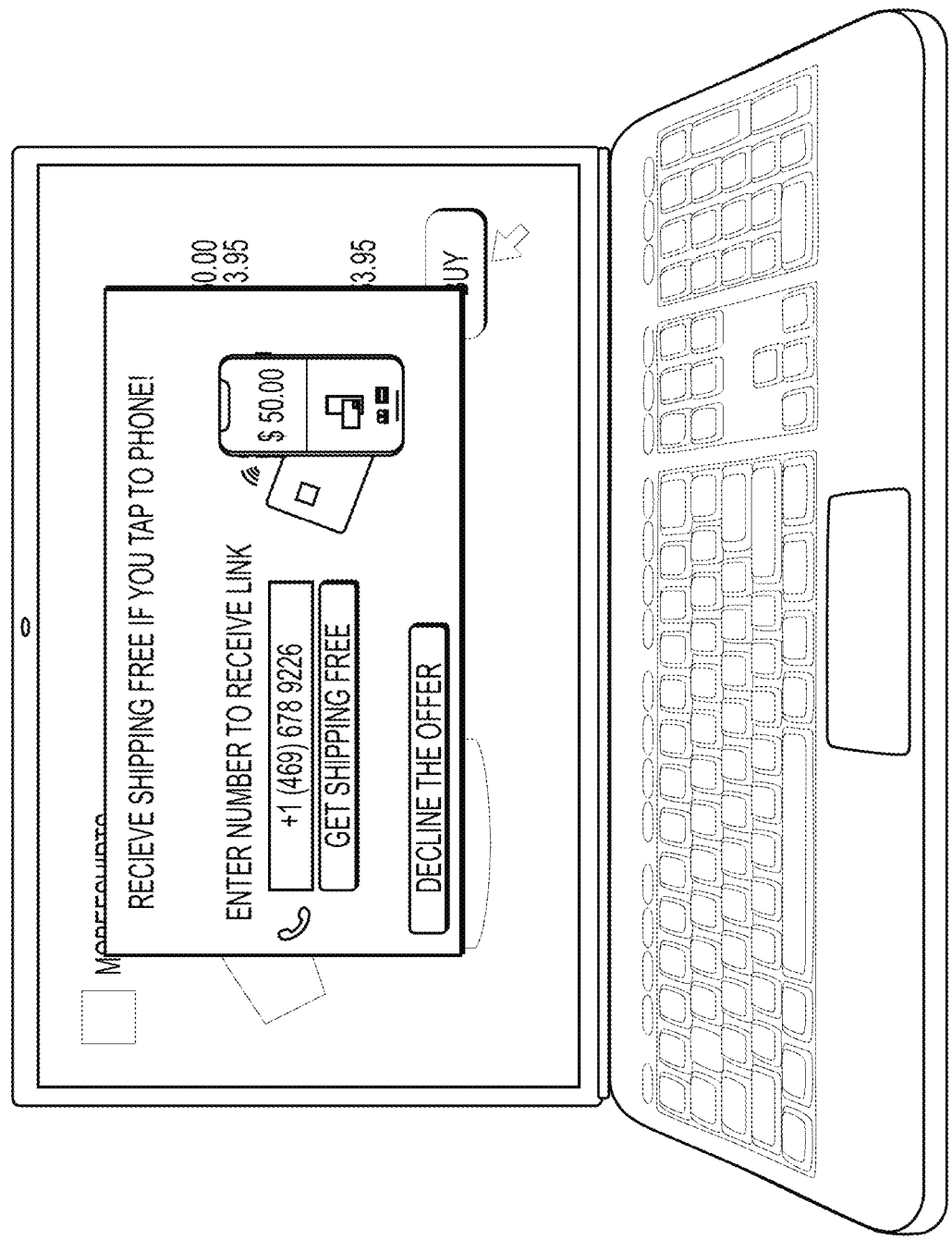

FIGS. 9 to 15 illustrate exemplary embodiments of graphical user interfaces (GUIs) implementing the present technology. FIG. 9 illustrates a buyer accessing a seller's website. The buyer may be requesting to make a purchase such as at step 505 of the method 500 or step 705 of the method 700. FIG. 10 illustrates a request for the buyer to enter a phone number of their mobile device to complete the transaction. The buyer may be encouraged to provide their phone number, such as by offering free shipping or another incentive. FIG. 10 illustrates an interface that may be displayed at step 505 of the method 500 and step 705 of the method 700.

Figure 11:
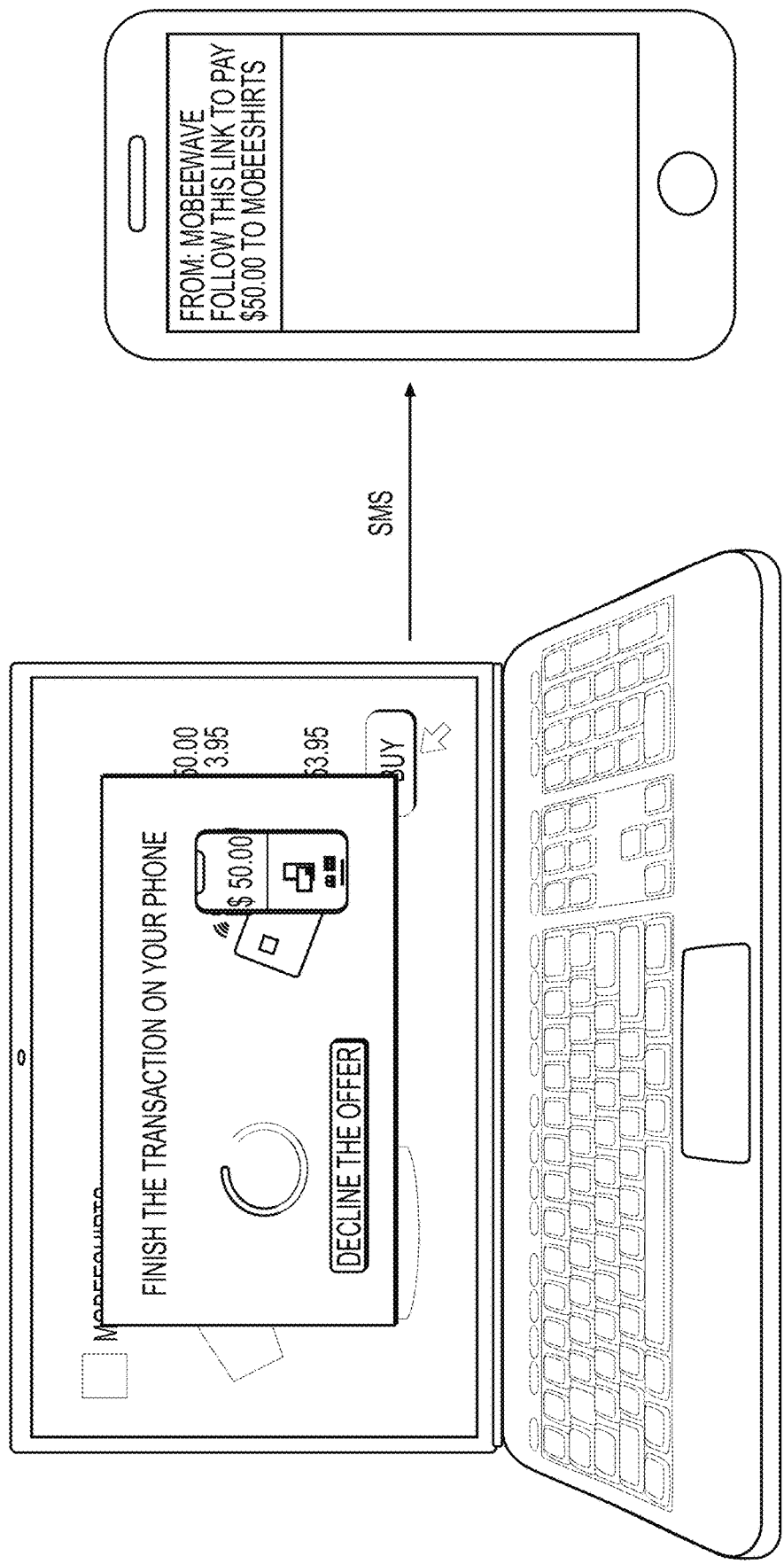
Figure 12:
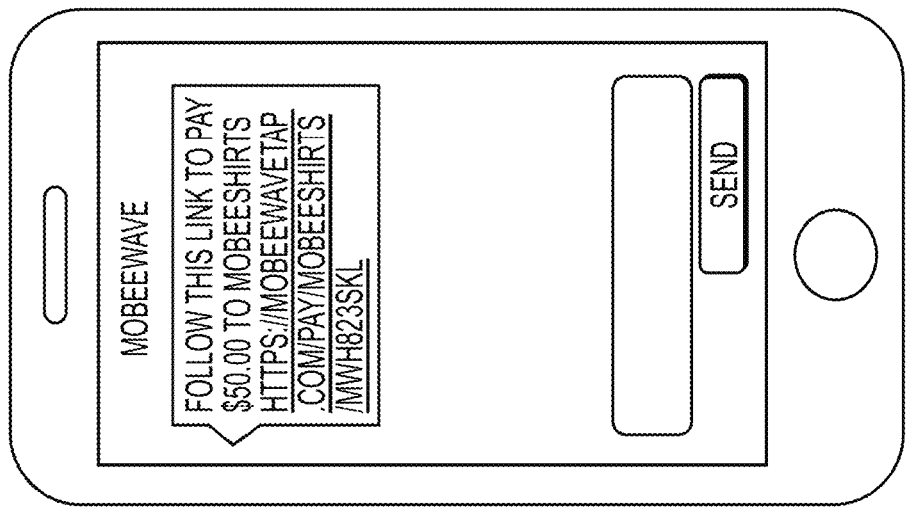
Figure 12:
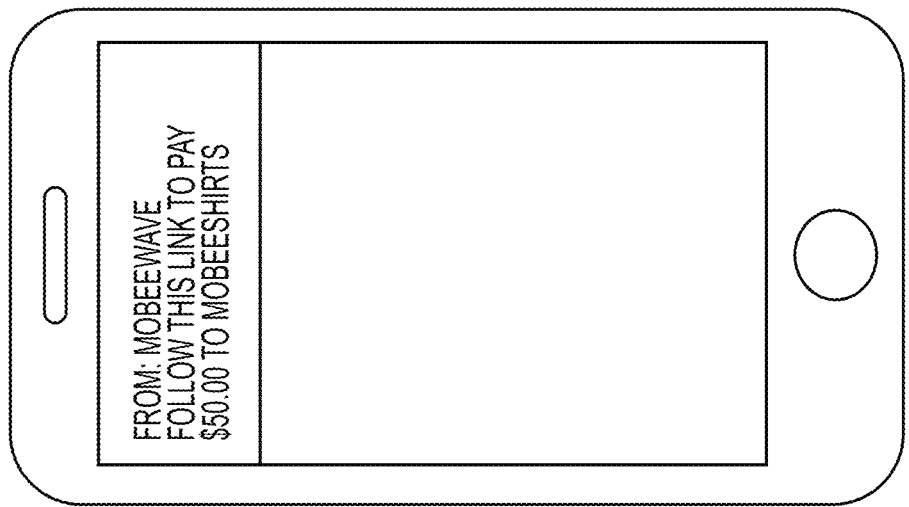

FIG. 11 illustrates the buyer's mobile device receiving a message requesting the buyer to select a link to complete the transaction. The message may be sent by SMS and/or any other messaging protocol. FIG. 12 illustrates the contents of the message received by the buyer's mobile device. The message requests that the buyer access a URL to complete the transaction. FIGS. 11 and 12 illustrate interfaces that may be displayed at step 515 of the method 500 and step 715 of the method 700.

Figure 13:
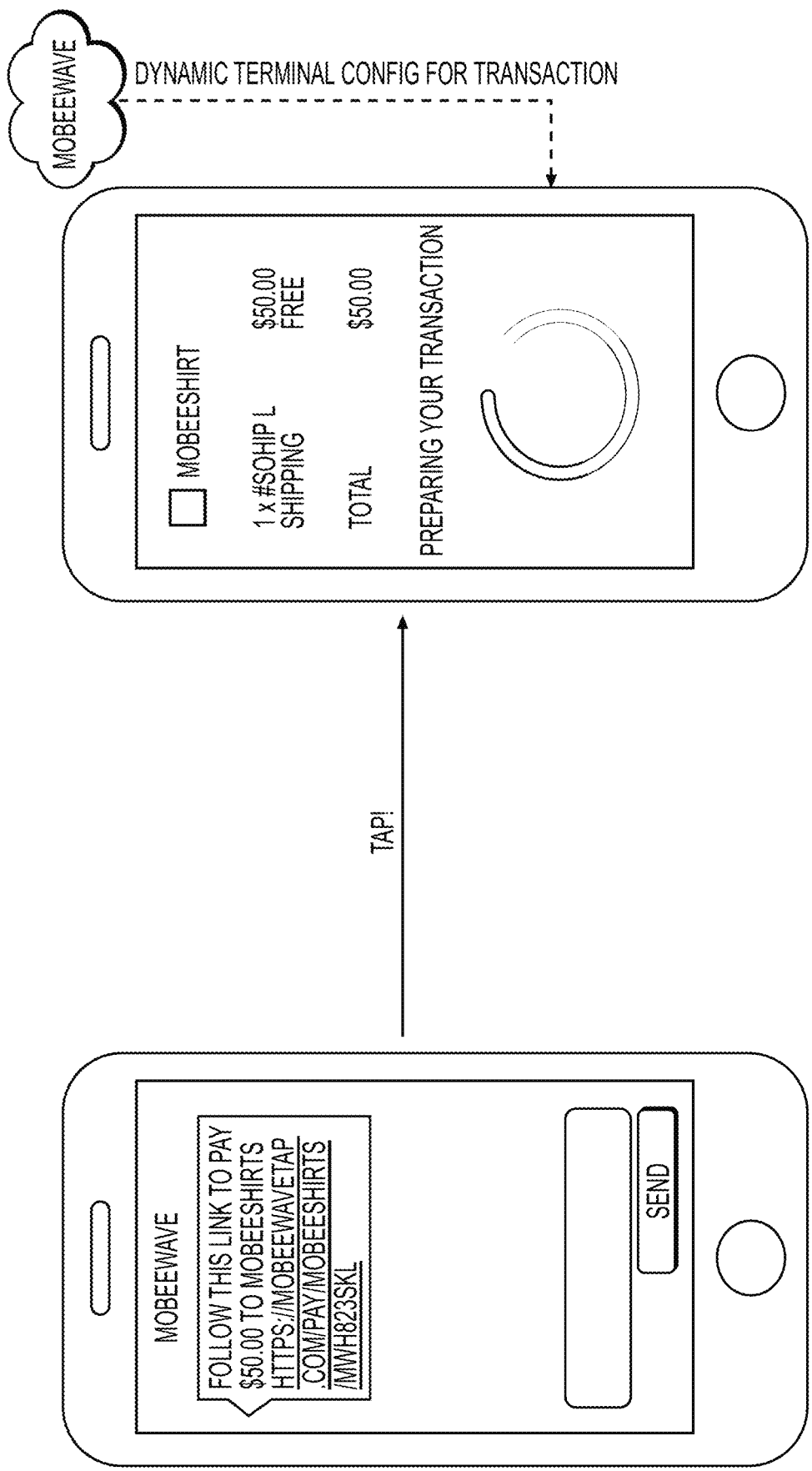
Figure 14:
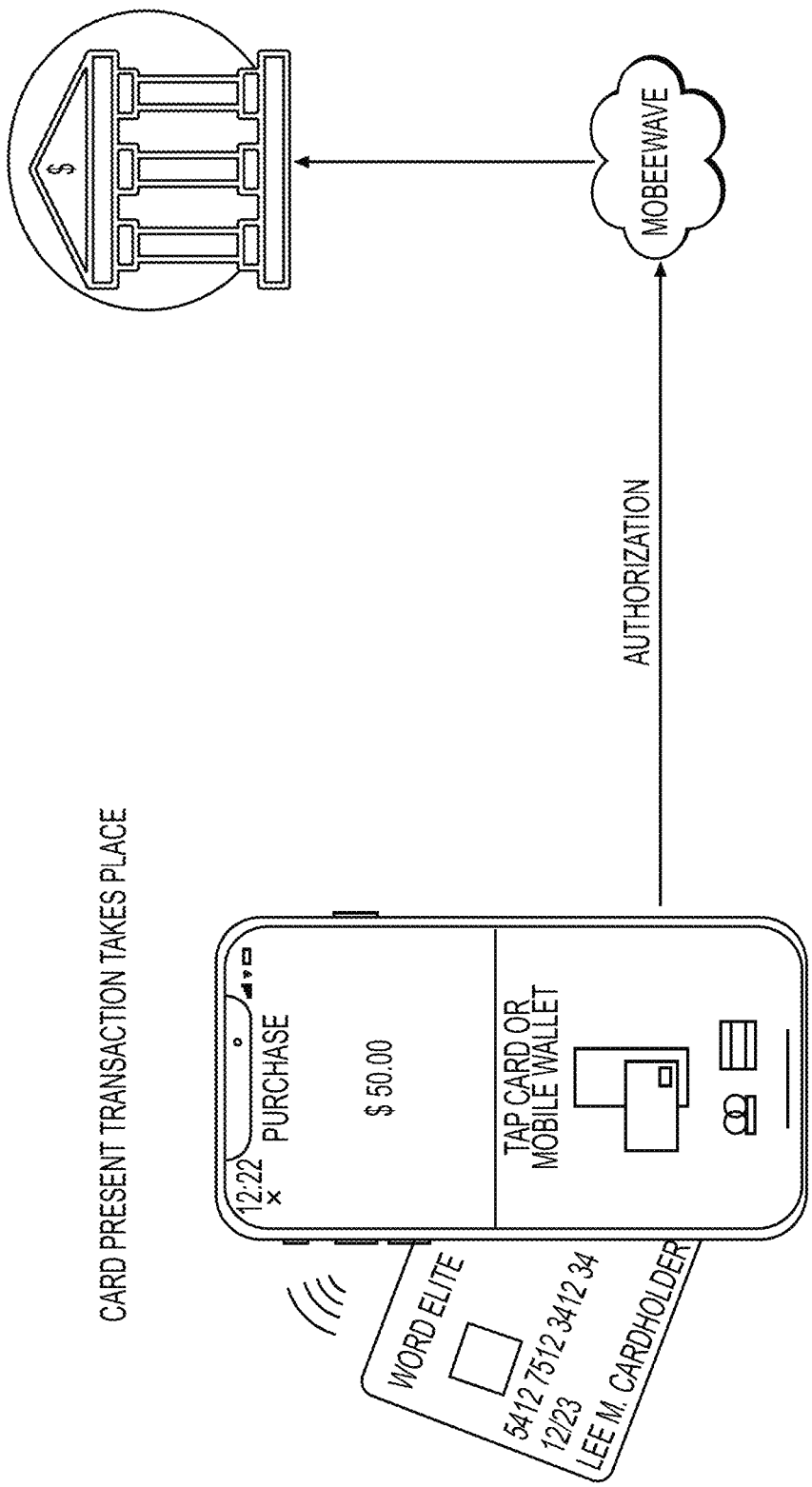

FIG. 13 illustrates the result of selecting the URL in the message. Data corresponding to the payment request is being downloaded by the buyer's mobile device. The data may include a configuration for a payment applet. FIG. 13 illustrates interfaces that may be displayed at step 525 of the method 500 and step 725 of the method 700. FIG. 14 illustrates a user interface of the payment applet. The user interface requests that the buyer place their payment card within a close proximity of the buyer's mobile device so that the NFC reader of the mobile device can read payment card data of the payment card. FIG. 14 illustrates interfaces that may be displayed at step 530 of the method 500 and step 730 of the method 700.

Figure 15:
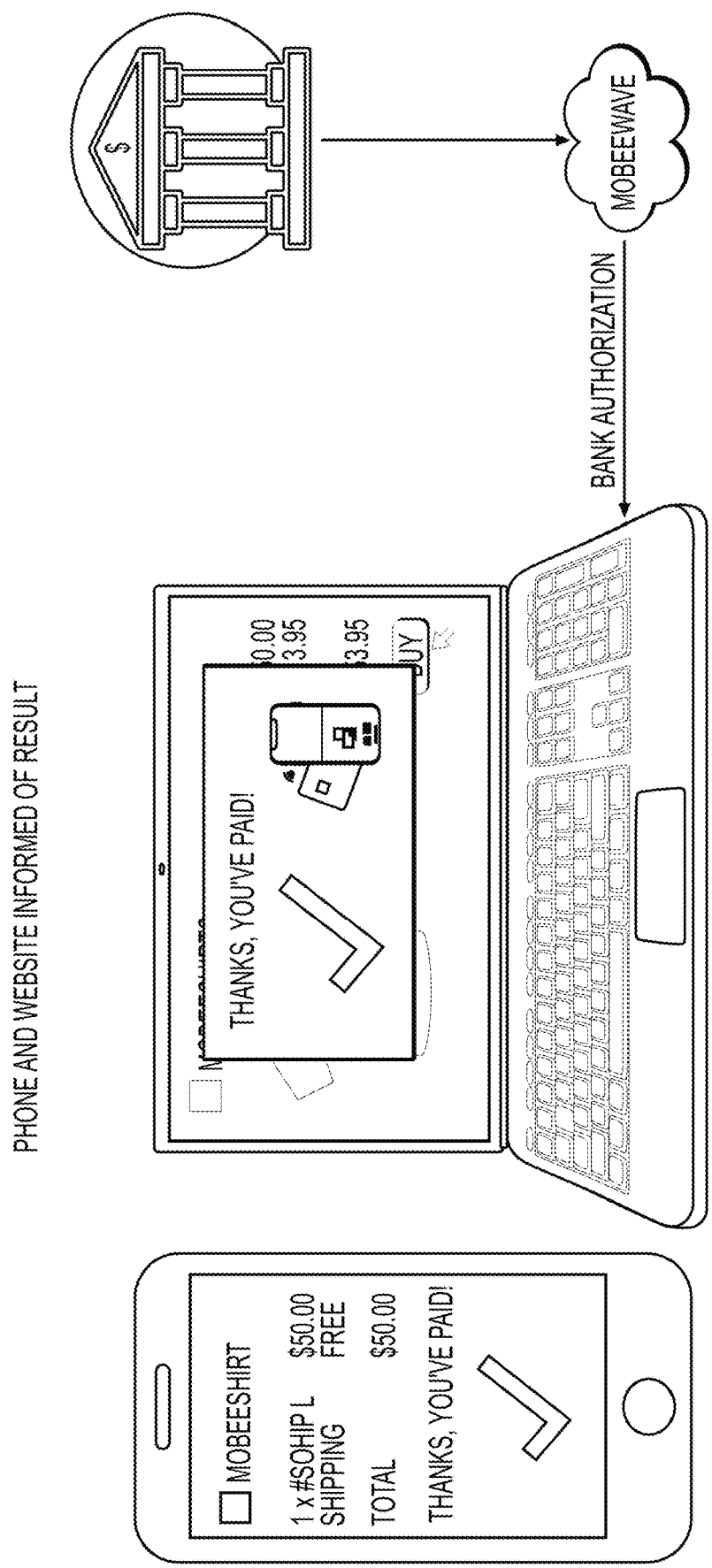

FIG. 15 illustrates a notification presented by the buyer's mobile device and the seller's website indicating that transaction result. FIG. 15 illustrates interfaces that may be displayed at step 560 of the method 500 and step 760 of the method 700.

Notably, the features and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s) (including the contents of the documents cited and incorporated by reference herein), readily modify and/or adapt for various applications such specific embodiments, without undue experimentation and without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While the above-described implementations have been described and shown with reference to particular steps performed in a particular order, it will be understood that these steps may be combined, sub-divided, or re-ordered without departing from the teachings of the present technology. The steps may be executed in parallel or in series. Accordingly, the order and grouping of the steps is not a limitation of the present technology.

While various embodiments of the present disclosure have been described above, it should be understood that they have been presented by way of example, and not limitations. It would be apparent to one skilled in the relevant art(s) that various changes in form and detail could be made therein without departing from the spirit and scope of the disclosure. Thus, the present disclosure should not be limited by any of the above-described exemplary embodiments, but should be defined only in accordance with the following claims and their equivalents.

What is claimed is:

1. A method, comprising:
    receiving, by a service provider device, a transaction request from a first user device;
    transmitting, by the service provider device, a first request for a mobile device identifier of a second user device, the request transmitted to the first user device;
    receiving, by the service provider device, the mobile device identifier of the second user device from the first user device;
    transmitting, by service provider device, a second request for a communication service device to send a message to the second user device using the mobile device identifier;
    receiving, by the second user device, the message from the communication service device, the message comprising executable content for requesting an applet;
    transmitting, by the second user device, an applet request to a server to request the applet, the applet request comprising transaction information;
    receiving, by the second user device, information to provision the applet on the second user device;
    presenting, on a user interface of the second user device, a prompt for account information associated with the transaction;
    reading, by a near-field communication (NFC) interface of the second user device, the account information from a payment device, the NFC interface controlled by the applet;
    transmitting, by the applet of the second user device, the account information from the payment device to the server;
    receiving, from the server, the account information associated with the applet on the second user device;
    transmitting, by the service provider device, the transaction information comprising the account information associated with the second user device to a transaction processing service;
    receiving, by the service provider device, a transaction result, and
    transmitting, by the service provider device, a notification to the first user device indicating the transaction result.

2. The method of claim 1, wherein the server corresponds to an applet management service or a device management service.

3. The method of claim 1, wherein the account information comprises a token generated by an application of the second user device.

4. The method of claim 1, wherein the first request is transmitted to the communication service device and comprises the mobile device identifier.

5. The method of claim 1, wherein the transaction information comprises a transaction amount.

6. The method of claim 1, wherein the mobile device identifier comprises a phone number corresponding to the second user device.

7. The method of claim 1, wherein the transaction result indicates that the transaction was approved or declined.

8. The method of claim 1, wherein the service provider device is associated with an e-commerce platform.

9. The method of claim 1, further comprising:
determining, based at least in part on the mobile device identifier of the second user device, an operating system of the second user device; and
transmitting, to the server, data corresponding to the transaction request and the mobile device identifier of the second user device, the server corresponding to the operating system.

10. A system, comprising:
a service provider device, comprising:
a first processor of the service provider device; and
a first computer-readable medium comprising first instructions that when executed by the first processor cause the first processor to at least:
receive a transaction request from a first user device;
transmit a first request for a mobile device identifier of a second user device, the request transmitted to the first user device;
receive the mobile device identifier of the second user device from the first user device;
transmit a second request for a communication service device to send a message to the second user device using the mobile device identifier;
receive, from a server, account information associated with a payment device and via an applet on the second user device;
transmit the transaction information comprising the account information associated with the second user device to a transaction processing service;
receive a transaction result, and
transmit a notification to the first user device indicating the transaction result; and
the second user device, comprising:
a second processor of the second user device;
a near-field communication (NFC) device of the second user device; and
a second computer-readable medium comprising second instructions that when executed by the second processor cause the second processor to at least, and prior to receiving the account information from the server;
receive the message from the communication service device, the message comprising executable content for requesting the applet;
transmit an applet request to the server to request the applet, the applet request comprising the transaction information;
receive information to provision the applet on the second user device;
present, on a user interface of the second user device, a prompt for the account information associated with the transaction;
read, by the near-field communication (NFC) interface, the account information from the payment device, the NFC interface controlled by the applet; and
transmit, by the applet, the account information from the payment device to the server.

11. The system of claim 10, wherein the server corresponds to an applet management service or a device management service.

12. The system of claim 10, wherein the account information comprises a token generated by an application of the second user device.

13. A computer-readable medium configured to store computer-readable instructions that, when executed by a processor of a service provider or a second user device, configures the processor to perform operations comprising:
receiving, by the service provider device, a transaction request from a first user device;
transmitting, by the service provider device, a request for a mobile device identifier of a second user device, the request transmitted to the first user device;
receiving, by the service provider device, the mobile device identifier of the second user device from the first user device;
transmitting, by the service provider device, a request for a communication service device to send a message to the second user device using the mobile device identifier;
receiving, by the second user device, the message from the communication service device, the message comprising executable content for requesting an applet;
transmitting, by the second user device, an applet request to a server to request the applet, the applet request comprising transaction information;
receiving, by the second user device, information to provision the applet on the second user device;
presenting, on a user interface of the second user device, a prompt for account information associated with the transaction;
reading, by a near-field communication (NFC) interface of the second user device, the account information from a payment device, the NFC interface controlled by the applet;
transmitting, by the applet of the second user device, the account information from the payment device to the server;
receiving, by the service provider device and from the server, the account information associated with the payment device and via the applet on the second user device;
transmitting, by the service provider device, transaction information comprising the account information associated with the second user device to a transaction processing service;
receiving, by the service provider device, a transaction result, and
transmitting, by the service provider device, a notification to the first user device indicating the transaction result.

14. The computer-readable medium of claim 13, wherein the server corresponds to an applet management service or a device management service.

15. The computer-readable medium of claim 14, wherein the account information comprises a token generated by an application of the second user device.

16. The computer-readable medium of claim 14, wherein the mobile device identifier comprises a phone number corresponding to the second user device.

17. The computer-readable medium of claim 14, wherein the transaction result indicates that the transaction was approved or declined.

\* \* \* \* \*